United States Patent
Okutani et al.

(10) Patent No.: US 7,634,524 B2
(45) Date of Patent: Dec. 15, 2009

(54) ARITHMETIC METHOD AND FUNCTION ARITHMETIC CIRCUIT FOR A FAST FOURIER TRANSFORM

(75) Inventors: Shigeaki Okutani, Kawasaki (JP);
Toshiro Nakazuru, Kawasaki (JP);
Noboru Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 958 days.

(21) Appl. No.: 10/823,570

(22) Filed: Apr. 14, 2004

(65) Prior Publication Data

US 2005/0131975 A1    Jun. 16, 2005

(30) Foreign Application Priority Data

Dec. 12, 2003   (JP)   ............... 2003-414688

(51) Int. Cl.
  *G06F 1/02*   (2006.01)
(52) U.S. Cl. ............... 708/270; 708/276; 708/400; 708/403; 708/404
(58) Field of Classification Search ......... 708/400–420, 708/276, 270
  See application file for complete search history.

(56) References Cited

U.S. PATENT DOCUMENTS

| | | | | |
|---|---|---|---|---|
| 3,564,223 A | * | 2/1971 | Harris et al. ................ | 708/446 |
| 3,569,894 A | * | 3/1971 | Bolduc et al. ............... | 338/12 |
| 4,077,063 A | * | 2/1978 | Lind ........................... | 708/440 |
| 4,905,177 A | * | 2/1990 | Weaver et al. ............... | 708/276 |
| 6,363,405 B1 | * | 3/2002 | Loginov ...................... | 708/270 |

FOREIGN PATENT DOCUMENTS

| | | |
|---|---|---|
| JP | 6-19955 | 1/1994 |
| JP | 10-214176 | 8/1998 |
| WO | WO 8906838 A1 * | 7/1989 |

* cited by examiner

*Primary Examiner*—Lewis A Bullock, Jr.
*Assistant Examiner*—Michael Yaary
(74) *Attorney, Agent, or Firm*—Staas & Halsey LLP

(57) ABSTRACT

A cyclic equation setting unit transforms and sets a Taylor series equation for calculating a sine function into a single cyclic equation common to terms of the Taylor series equation, the single cyclic equation having a new known number Q that is defined by multiplying a known number Q and the square of a variable X, shifting the result by a shift number S and then adding a constant K thereto. An adjustment unit adjusts and prepares the shift number S such that within a variation range of the variable X the variable X has a maximum value 1 with the constant K being not greater than 1. A cyclic equation executing unit inputs and converts angle information i to the variable X, and executing the cyclic equation in sequence from higher order term to lower order term for the number of terms of the Taylor series equation to derive a sine function of the angle information i.

16 Claims, 23 Drawing Sheets

FIG. 6

| TERM | d | $(2\pi)^d/d!$ | CONSTANT Kd | SHIFT NUMBER Sd | |
|---|---|---|---|---|---|
| | | | | IF CALCULATED UP TO 45 DEGREES | IF CALCULATED UP TO 90 DEGREES |
| sin | 1 | 6.283185 | 0.785398 | — | — |
| | 3 | 41.341702 | −0.645964 | 3 | 0 |
| | 5 | 81.605249 | 0.637541 | 5 | 3 |
| | 7 | 76.705860 | −0.599265 | 6 | 4 |
| | 9 | 42.058694 | 0.657167 | 7 | 5 |
| | 11 | 15.094643 | −0.943415 | 8 | 6 |
| | 13 | 3.819953 | 0.954988 | 8 | 6 |
| | 15 | 0.718122 | −0.718122 | 8 | 6 |
| | 17 | 0.104229 | 0.833833 | 9 | 7 |
| | 19 | 0.012032 | −0.770022 | 9 | 7 |
| | 21 | 0.001131 | 0.579033 | 9 | 7 |
| cos | 0 | — | 1.000000 | — | — |
| | 2 | 19.739209 | −0.616850 | 1 | −1 |
| | 4 | 64.939394 | 0.507339 | 4 | 2 |
| | 6 | 85.456817 | −0.667631 | 6 | 4 |
| | 8 | 60.244641 | 0.941323 | 7 | 5 |
| | 10 | 26.426257 | −0.825821 | 7 | 5 |
| | 12 | 7.903536 | 0.987942 | 8 | 6 |
| | 14 | 1.714391 | −0.857195 | 8 | 6 |
| | 16 | 0.282006 | 0.564012 | 8 | 6 |
| | 18 | 0.036383 | −0.582125 | 9 | 7 |
| | 20 | 0.003780 | 0.967638 | 10 | 8 |

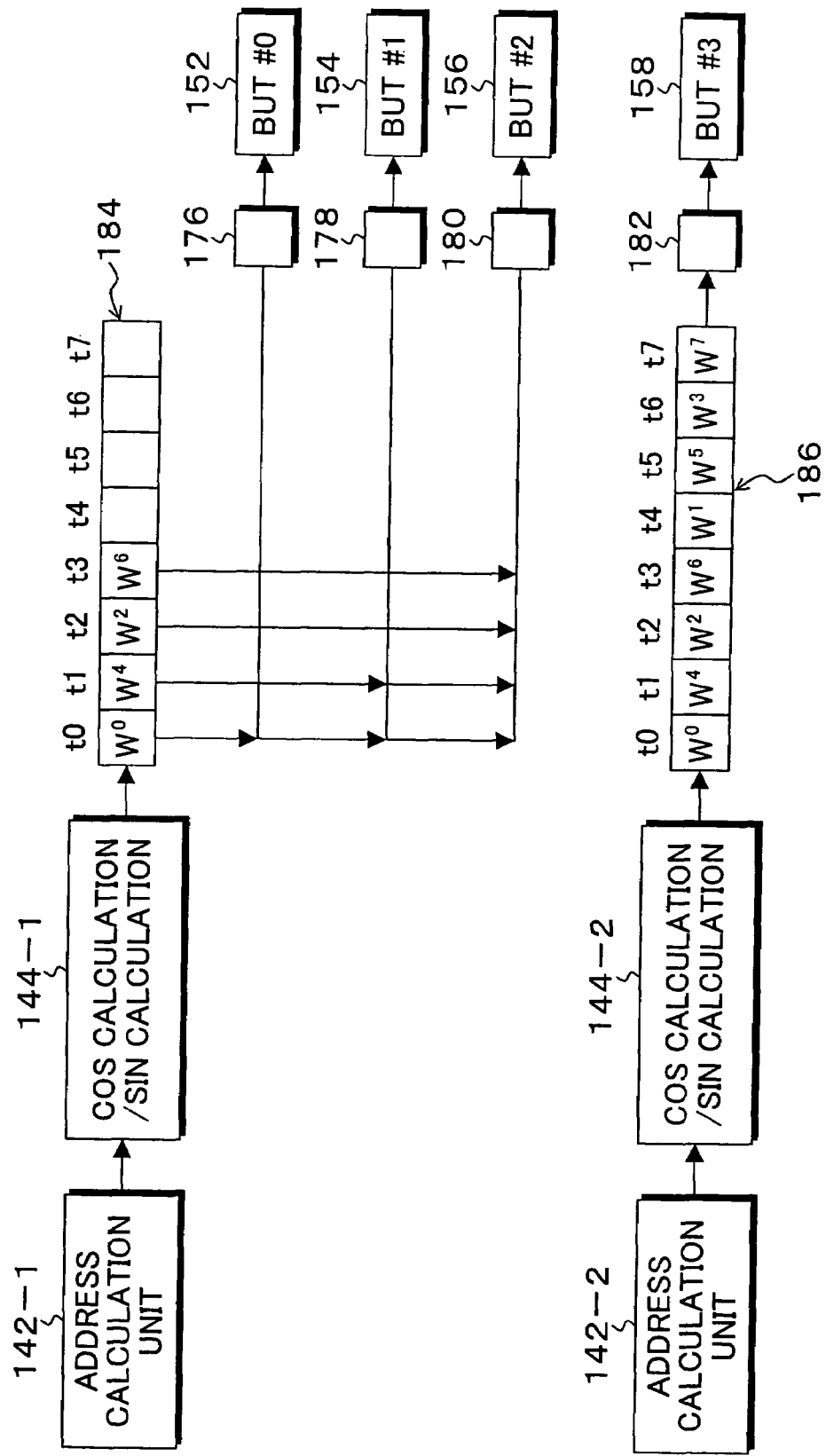

ARITHMETIC METHOD AND FUNCTION ARITHMETIC CIRCUIT FOR A FAST FOURIER TRANSFORM

BACKGROUND OF THE INVENTION

1. Field of the Invention

The present invention relates generally to a function calculation method and a function arithmetic circuit for calculating a sine function and a cosine function with the Taylor series equation and, more particularly, to a function calculation method and a function arithmetic circuit for calculating for use a sine function and a cosine function in synchronism with an arithmetic cycle of fast Fourier transform.

2. Description of the Related Arts

Traditionally, in information processing apparatuses using computers, sine functions and cosine functions calculated from angle information are sometimes used. Especially, when signal processes such as Fourier transform are performed by hardware, values of a sine function and a cosine function are found using angle information as an address and are used in an arithmetic process.

FIG. 1 shows an example of a conventional system which performs fast Fourier transform in the field of radio astronomy. An analogue time-series signal 202 such as electric waves and audio signals received by a dedicated parabolic antenna 200 are converted by an AD conversion apparatus into a digital signal 205 and then decomposed to a frequency component 208 by executing a fast Fourier transform process in a Fourier transform apparatus 206 and analyzed. In this Fourier transform apparatus 206, angle information is considered as an address, and a sine function and a cosine function corresponding to the address are used as arithmetic parameters.

FIGS. 2A and 2B show an example of a conventional pipeline fast Fourier transform apparatus (see Japanese Patent Application Laid-Open Pub. No. 06-019955). In FIGS. 2A and 2B, the conventional fast Fourier transform apparatus consists of sorting circuit units 242, 252, 256 and 260, butterfly arithmetic units 244, 254, 258 and 262 and twist coefficient memory circuit units 264, 266, 268 and 270, and for example, the butterfly arithmetic units 244 consists of an adder 246 and multipliers 248 and 250. This fast Fourier transform apparatus is a circuit performing fast Fourier transform of which the number of fast Fourier transform (FFT) points to be processed is N, divides an input data point number N into N/R (wherein R is a radix), arranges the divided input data point number in serial, inputs it to a basic circuit of the fast Fourier transform which consists of a data sorting circuit unit of R input, a twist coefficient multiplier unit and a butterfly arithmetic unit, and is configured such that the fast Fourier transform are performed with considering this basic circuit as one (1) stage and arranging M stages (M=log R N) in parallel. In this fast Fourier transform, a twist coefficient derived from a sine function and a cosine function of angle information indicating an address is found in advance, and the process is executed with holding this in memory constituting the twist coefficient memory circuit units 264, 266, 268 and 270, considering the angle information as an address.

By the way, traditionally, as a method for finding a sine function and a cosine function corresponding to the angle information indicating the address, a look-up table 210 of FIG. 3 is known. The look-up table 210 consists of memory 212 holding values of the sine function and the cosine function, considering the angle information as an address i. In the fast Fourier transform apparatus of FIGS. 2A and 2B, the twist coefficient is calculated from the sine function and the cosine function calculated in advance and is stored in the memory, but when resolution of the angle information becomes higher, capacity of memory holding the twist coefficient is increased in proportion to the resolution. Therefore, if the sine function and the cosine function are calculated in the fast Fourier arithmetic at a high speed, the memory for calculating and storing the twist coefficient, and when the resolution is improved, capacity of the memory will not increased. As these methods for calculating the sine function and the cosine function in conformity with the arithmetic speed of the fast Fourier transform, a circuit in which an arithmetic process based on a Taylor series equation is simply achieved by hardware is considered. An arithmetic principle of this circuit is as follows. Assuming that angles 0 to 360 degrees are divided equally into N, the i-th angle $\theta i$ is represented by following equation.

$$\theta i = 2\pi i/N$$

The Taylor series of the sine and the cosine for this i-th angle $\theta i$ is as follows.

$$\sin\theta i = \theta i - (\theta i^3/3!) + (\theta i^5/5!) - (\theta i^7/7!) + (\theta i^9/9!) - \ldots$$
$$= (2\pi i/N) - \{(2\pi i/N)^3/3!\} + \{(2\pi i/N)^5/5!\} - \{(2\pi i/N)^7/7!\} + \ldots$$
$$\cos\theta i = 1 - (\theta i^2/2!) + (\theta i^4/4!) - (\theta i^6/6!) + (\theta i^8/8!) - \ldots$$
$$= 1 - \{(2\pi i/N)^2/2!\} + \{(2\pi i/N)^4/4!\} - \{(2\pi i/N)^6/6!\} + \ldots$$

FIG. 4 shows a simple circuit based on hardware which finds $\sin\theta$ from the Taylor series, and the arithmetic of the Taylor series equation up to the fourth term is achieved by a multiplier 218, a shifter 220, adders 222, 224, 226, 230, 232, 236 and 238 and adders 228, 234, 240. In this circuit, for example in the case of the Taylor series which has four (4) terms, the value of the sine function can be calculated in about 10 clock cycles. Further, as a method for quickly calculating a transcendental function including trigonometric functions, there is an apparatus which executes parallel processing of the Taylor series (see Japanese Patent Application Laid-Open Pub. No. 10-214176). This apparatus executes a parallel process in which the Taylor series is divided into two (2) partial series and processed in parallel and then two (2) results are subtracted. For example, in the case of the Taylor series which has 10 terms, by decomposing it to partial series which have five (5) terms and processing them in parallel, the sine function and the cosine function can be calculated in about 10 clock cycles. Each parallel processing unit executes the process by transforming cyclically, and floating-point arithmetic is assumed.

However, in these conventional methods for finding a sine function and a cosine function with the use of Taylor series equations, there are following problems. First, as shown in FIG. 4, in the case that each term of the Taylor series equation is simply achieved by a hardware arithmetic circuit, scale of hardware is increased corresponding to the number of terms, and clock cycles required for the arithmetic are also increased, therefore there is a problem which reduce the overall arithmetic speed if it is applied to fast Fourier transform. On the other hand, in the method which calculates in parallel by dividing the Taylor series into two (2) partial series, although the arithmetic process speed can be increased by executing it in parallel, the scale of hardware is equivalent to the case that it is not divided into partial series, and the scale of circuit is large, and if achieved by software, there is a problem of a high processing load, because parallel processing of floating-point arithmetic is executed.

SUMMARY OF THE INVENTION

According to the present invention there are provided a function arithmetic method and a function arithmetic circuit for calculating a sine function and a cosine function at a high speed utilizing the Taylor series equation. The present invention aims at providing a function arithmetic method and apparatus for calculating a sine function and a cosine function at a high speed utilizing the Taylor series equation, without using look-up table memory, for use in calculation of a twist coefficient of fast Fourier transform.

The present invention provides a function arithmetic method for calculating a sine function $\sin \theta$ i using a Taylor series equation. The function arithmetic method comprises a cyclic equation setting step, with a cyclic equation setting unit, transforming and setting a Taylor series equation for calculating a sine function into a single cyclic equation ($Q=K+S \cdot X^2 \cdot Q$) common to terms of the Taylor series equation, the single cyclic equation having a new known number Q that is defined by multiplying a known number Q and the square of a variable X, shifting the result by a shift number S and then adding a constant K thereto; an adjustment step, with an adjustment unit, adjusting and preparing the shift number S such that within a variation range of the variable X the variable X has a maximum value 1 with the constant K being not greater than 1; and a cyclic equation executing step, with a cyclic equation execution unit, inputting and converting angle information i to the variable X, and executing the cyclic equation in sequence from higher order term to lower order term for the number of terms of the Taylor series equation to derive a sine function of the angle information i. In this case, the cyclic equation executing step includes executing the arithmetic process of the known number Q, the variable X, an intermediate value after the shifting and the constant K of the cyclic equation with the number of bits that is obtained by adding the number of protect bits to the final number of the bits.

The present invention provides a function arithmetic method for calculating a cosine function $\cos \theta$ i using a Taylor series equation. The function arithmetic method comprises a cyclic equation setting step, with a cyclic equation setting unit, transforming and setting a Taylor series equation for calculating a cosine function into a single cyclic equation ($Q=K+S \cdot X^2 \cdot Q$) common to terms of the Taylor series equation, the single cyclic equation having a new known number Q that is defined by multiplying a known number Q and the square of a variable X, shifting the result by a shift number S and then adding a constant K thereto; an adjustment step, with an adjustment unit, adjusting and preparing the shift number S such that within a variation range of the variable X the variable X has a maximum value 1 with the constant K being not greater than 1; and a cyclic equation executing step, with a cyclic equation execution unit, inputting and converting angle information i to the variable X, and executing the cyclic equation in sequence from higher order term to lower order term for the number of terms of the Taylor series equation to derive a cosine function of the angle information i. In this case as well, the cyclic equation executing step includes executing the arithmetic process of the known number Q, the variable X, an intermediate value after the shifting and the constant K of the cyclic equation with the number of bits that is obtained by adding the number of protect bits to the final number of the bits.

The present invention provides a function arithmetic circuit for calculating a sine function $\sin \theta$ i using a Taylor series equation. The function arithmetic circuit comprises a cyclic equation arithmetic unit calculating a cyclic equation ($Q=K+S \cdot X^2 \cdot Q$) that is obtained by transforming a Taylor series equation for calculating a sine function, the cyclic equation having a new known number Q that is defined by multiplying a known number Q and the square of a variable X, shifting the result by a shift number S and then adding a constant K thereto; a conversion adjustment unit converting input angle information i into the variable X, as well as adjusting and outputting the shift number S such that the variable X has a maximum value 1 within a variation range of the variable X; a constant table finding in advance and holding constants K corresponding to terms of a Taylor series equation for calculating a sine function and the shift numbers adjusted such that the constants K becomes not greater than 1; and an arithmetic control unit causing the cyclic equation arithmetic unit to perform a cyclic arithmetic in sequence, based on the selection of the constant K and the shift number S of the constant table, from higher order term to lower order term for the number of terms of the Taylor series equation defined in advance when the variable X is output from the conversion adjustment unit, to thereby derive a sine function of the angle information i. In this case, the cyclic equation arithmetic unit executes the arithmetic process of the known number Q, the variable X, an intermediate value after the shifting and the constant K of the cyclic equation with the number of bits that is obtained by adding the number of protect bits to the final number of the bits.

The present invention provides a function arithmetic circuit for calculating a cosine function $\cos \theta$ i using a Taylor series equation. The function arithmetic circuit comprises a cyclic equation arithmetic unit calculating a cyclic equation ($Q=K+S \cdot X^2 \cdot Q$) that is obtained by transforming a Taylor series equation for calculating a cosine function, the cyclic equation having a new known number Q that is defined by multiplying a known number Q and the square of a variable X, shifting the result by a shift number S and then adding a constant K thereto; a conversion adjustment unit converting input angle information i into the variable X, as well as adjusting and outputting the shift number S such that the variable X has a maximum value 1 within a variation range of the variable X; a constant table finding in advance and holding constants K corresponding to terms of the Taylor series equation for calculating a cosine function and the shift numbers adjusted such that the constants K become not greater than 1; and an arithmetic control unit causing the cyclic equation arithmetic unit to perform a cyclic arithmetic in sequence, based on the selection of the constant K and the shift number S of the constant table, from higher order term to lower order term for the number of terms of the Taylor series equation defined in advance when the variable X is output from the conversion adjustment unit, to thereby derive a cosine function of the angle information i. In this case, the cyclic equation arithmetic unit executes the arithmetic process of the known number Q, the variable X, an intermediate value after the shifting and the constant K of the cyclic equation with the number of bits that is obtained by adding the number of protect bits to the final number of the bits.

The present invention provides a function arithmetic circuit for pipeline calculating a sine function $\sin \theta$ i using a Taylor series equation. The function arithmetic circuit comprises a pipeline arithmetic unit forming a pipeline connection which includes cyclic equation arithmetic units each provided for each term and calculating a cyclic equation ($Q=K+S \cdot X^2 \cdot Q$) obtained by transforming a Taylor series equation for calculating a sine function, the cyclic equation having a new known number Q that is defined by multiplying a known number Q and the square of a variable X, shifting the result by a shift number S and then adding a constant K thereto; a conversion adjustment unit converting input angle information i into the variable X and adjusting the shift number S such that the variable X has a maximum value 1 within a variation range of the variable X for the output to the pipeline arithmetic unit; a constant table finding in advance and holding the constants K corresponding to terms of the Taylor series equation for calculating a sine function and the shift numbers adjusted such that the constants K become not greater than 1; and a pipeline control unit causing the cyclic equation arithmetic units of the pipeline arithmetic unit to select the constant K and the shift number S of the corresponding term of the Taylor series equation from the constant table, to calculate in parallel and to derive a sine function of the angle information i based on the output of the cyclic equation arithmetic unit at the final stage, each time the variable X is output from the conversion adjustment unit. In this case, the cyclic equation arithmetic units of the pipeline arithmetic unit execute the arithmetic process of the known number Q, the variable X, an intermediate value after the shifting and the constant K of the cyclic equation with the number of bits that is obtained by adding the number of protect bits to the final number of the bits.

The present invention provides a function arithmetic circuit for pipeline calculating a cosine function cos θ i using a Taylor series equation. The function arithmetic circuit comprises a pipeline arithmetic unit forming a pipeline connection which includes cyclic equation arithmetic units each provided for each term and calculating a cyclic equation ($Q=K+S \cdot X^2 \cdot Q$) obtained by transforming a Taylor series equation for calculating a cosine function, the cyclic equation having a new known number Q that is defined by multiplying a known number Q and the square of a variable X, shifting the result by a shift number S and then adding a constant K thereto; a conversion adjustment unit converting input angle information i into the variable X and adjusting the shift number S such that the variable X has a maximum value 1 within a variation range of the variable X for the output to the pipeline arithmetic unit; a constant table finding in advance and holding the constants K corresponding to terms of the Taylor series equation for calculating a cosine function and the shift numbers adjusted such that the constants K become not greater than 1; and a pipeline control unit causing the cyclic equation arithmetic units of the pipeline arithmetic unit to select the constant K and the shift number S of the corresponding term of the Taylor series equation from the constant table, to calculate in parallel and to derive a cosine function of the angle information i based on the output of the cyclic equation arithmetic unit at the final stage, each time the variable X is output from the conversion adjustment unit. In this case as well, the cyclic equation arithmetic units of the pipeline arithmetic unit execute the arithmetic process of the known number Q, the variable X, an intermediate value after the shifting and the constant K of the cyclic equation with the number of bits that is obtained by adding the number of protect bits to the final number of the bits.

The present invention provides a function arithmetic circuit for pipeline calculating a sine function and a cosine function, suitable for a fast Fourier transform apparatus. The function arithmetic circuit comprises a sine function arithmetic circuit and a cosine function arithmetic circuit. The sine function arithmetic circuit includes a pipeline arithmetic unit forming a pipeline connection which includes cyclic equation arithmetic units each provided for each term and calculating a cyclic equation ($Q=K+S \cdot X^2 \cdot Q$) obtained by transforming a Taylor series equation for calculating a sine function, the cyclic equation having a new known number Q that is defined by multiplying a known number Q and the square of a variable X, shifting the result by a shift number S and then adding a constant K thereto; a conversion adjustment unit converting input angle information i into the variable X and adjusting the shift number S such that the variable X has a maximum value 1 within a variation range of the variable X for the output to the pipeline arithmetic unit; a constant table finding in advance and holding the constants K corresponding to terms of the Taylor series equation for calculating a sine function and the shift numbers adjusted such that the constants K become not greater than 1; and a pipeline control unit causing the cyclic equation arithmetic units of the pipeline arithmetic unit to select the constant K and the shift number S of the corresponding term of the Taylor series equation from the constant table, to calculate in parallel and to derive a sine function of the angle information i based on the output of the cyclic equation arithmetic unit at the final stage, each time the variable X is output from the conversion adjustment unit. The cosine function arithmetic circuit includes a pipeline arithmetic unit forming a pipeline connection which includes cyclic equation arithmetic units each provided for each term and calculating a cyclic equation ($Q=K+S \cdot X^2 \cdot Q$) obtained by transforming a Taylor series equation for calculating a cosine function, the cyclic equation having a new known number Q that is defined by multiplying a known number Q and the square of a variable X, shifting the result by a shift number S and then adding a constant K thereto; a conversion adjustment unit converting input angle information i into the variable X and adjusting the shift number S such that the variable X has a maximum value 1 within a variation range of the variable X for the output to the pipeline arithmetic unit; a constant table finding in advance and holding the constants K corresponding to terms of the Taylor series equation for calculating a cosine function and the shift numbers adjusted such that the constants K become not greater than 1; and a pipeline control unit causing the cyclic equation arithmetic units of the pipeline arithmetic unit to select the constant K and the shift number S of the corresponding term of the Taylor series equation from the constant table, to calculate in parallel and to derive a cosine function of the angle information i based on the output of the cyclic equation arithmetic unit at the final stage, each time the variable X is output from the conversion adjustment unit. In this case, the cyclic equation arithmetic units of the pipeline arithmetic unit execute the arithmetic process of the known number Q, the variable X, an intermediate value after the shifting and the constant K of the cyclic equation with the number of bits that is obtained by adding the number of protect bits to the final number of the bits.

In this function arithmetic circuit, twist coefficient values of a plurality of butterfly stages provided in a pipeline fast Fourier transform apparatus whose radix is 2 are calculated based on the sine function and cosine function of the input information i.

The present invention provides a function arithmetic method for calculating, using a Taylor series equation, general transcendental functions including sine functions and cosine functions, i.e., transcendental functions that are defined as functions that cannot be expressed in the form of polynomials, such as trigonometric functions, logarithms and exponential functions. The function arithmetic method comprises a cyclic equation setting step, with a cyclic equation setting unit, transforming and setting a Taylor series equation for calculating a transcendental function into a single cyclic equation ($Q=K+S \cdot X^2 \cdot Q$) common to terms of the Taylor series equation, the cyclic equation having a new known number Q that is defined by multiplying a known number Q and a variable X, shifting the result by a shift number S and then adding a constant K thereto; an adjustment step, with an adjustment unit, adjusting and preparing the shift number S such that within a variation range of the variable X the variable X has a maximum value 1 with the constant K being not greater than 1; and a cyclic equation executing step, with a cyclic equation execution unit, converting input information to the variable X and executing the cyclic equation in sequence from higher order term to lower order term for the number of terms of the Taylor series equation to thereby derive a transcendental function of the input information.

Thus, according to the present invention, by transforming a Taylor series equation into one (1) cyclic equation which is common to terms of the Taylor series equation, details of arithmetic which is performed from higher order to lower order can be standardized, and in both cases of performing cyclic calculation and performing pipeline calculation, an arithmetic algorithm is simplified; a processing load is reduced in software; a circuit structure is simplified in hardware; and a higher speed can be achieved in both. Also, by introducing shift operations of bits, even with the same minimum small number of arithmetic bits, necessary arithmetic bit accuracy can be ensured. As a result, without using floating-point arithmetic or an arithmetic circuit with the large number of bits, fixed-point arithmetic circuit with the small number of bits can be used, and function calculation with small hardware can be easily achieved. Further, by applying a pipeline function arithmetic circuit of the present invention to a fast Fourier transform apparatus, a twist coefficient can be calculated in real time, and conventional memory for holding the twist coefficient is unnecessary, and if the number of fast Fourier transform points becomes larger, the twist coefficient can be accurately generated by smaller hardware than the case of using the twist coefficient memory.

Consequently, although the conventional Fourier transform apparatus is constructed by integrating butterfly arithmetic circuits and others into LSI and using external memory for the twist coefficient, it is possible to relatively easily construct it with LSI only, by using the pipeline function arithmetic circuit of the present invention.

The above and other objects, features and advantages of the present invention will become more apparent from the following detailed description with reference to the drawings.

BRIEF DESCRIPTION OF THE DRAWINGS

FIG. 6 is an explanatory view of table contents used in function arithmetic of FIG. 5;

FIG. 20 is a block diagram of a twist coefficient arithmetic circuit used in the fast Fourier transform circuit of FIGS. 19A and 19B.

DESCRIPTION OF THE PREFERRED EMBODIMENTS

Figure 5:
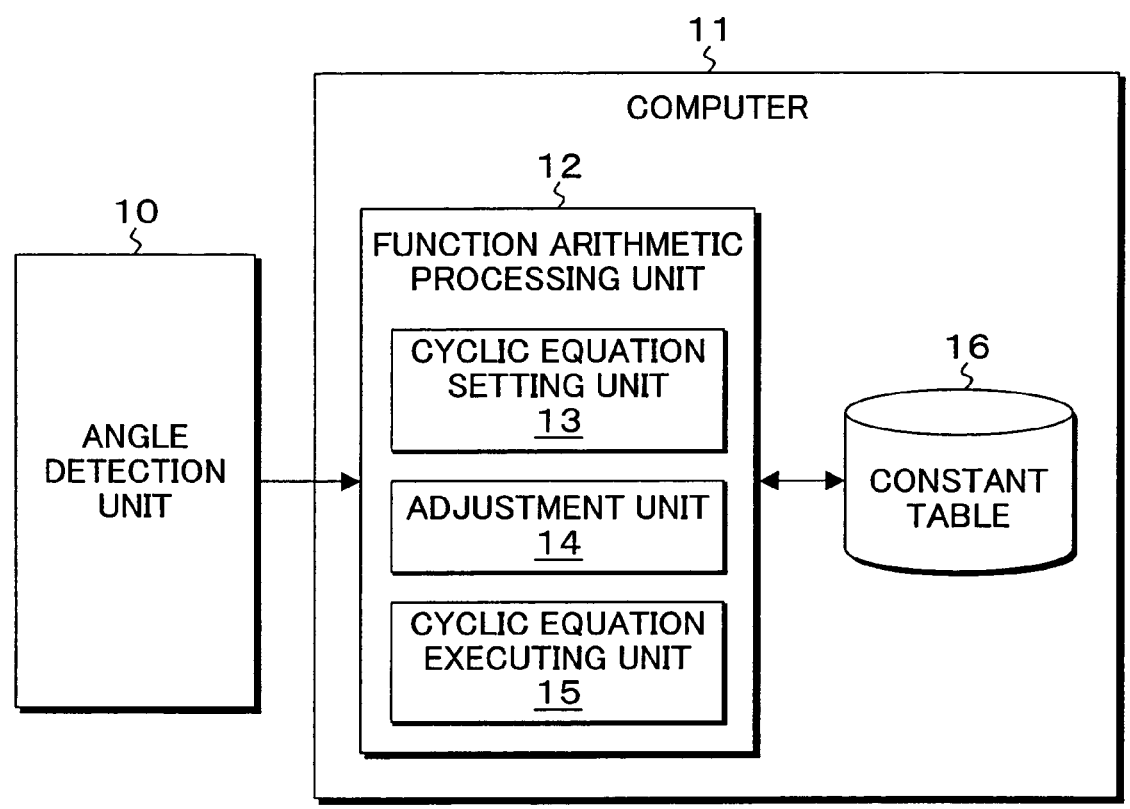
FIG. 5 is a block diagram of a functional structure of a function arithmetic process of the present invention achieved by a program of a computer.

FIG. 5 is a block diagram of a functional structure of a function arithmetic process of the present invention achieved by a program of a computer. In FIG. 5, a function arithmetic processing system of the present invention consists of an angle detection unit 10 and a computer 11 As the angle detection unit 10, for example, a rotary encoder and others are used, which output address i when angles 0 to 360 degrees are divided equally into N and represent an angle $\theta$ i of this address i. In the computer 11, a function arithmetic processing unit 12 is provided, which inputs the address i from the angle detection unit 10 and calculates a sine function and cosine function of sin $\theta$ i and cos $\theta$ i. The function arithmetic processing unit 12 consists of a cyclic equation setting unit 13, an adjustment unit 14 and a cyclic equation executing unit 15, and a constant table 16 is further provided, which stores constant and others used by the cyclic equation executing unit 15. The cyclic equation setting unit 13 transforms a Taylor series equation for calculating the sine function and the cosine function into a single cyclic equation which is common to terms of the Taylor series equation of the Taylor series equation and set this to the cyclic equation executing unit 15. This cyclic equation is given by following equation.

$$Qd = Kd + S(d+2) \cdot Xi^2 \cdot [Q(d+2)] \quad (1)$$

In the cyclic equation (1), the Taylor series equation is to multiply known number Q(d+2) by a squared variable Xi and shift the result by a shift number S(d+2). A transform process from this Taylor series equation to the cyclic equation is clarified in description below. For the cyclic equation of equation (1), the adjustment unit 14 adjusts the variable Xi such that a maximum value of the variable Xi becomes 1 within a transform range and the shift number S(d+2) such that the a constant Kd will be not greater than 1 and prepares this in the constant table 16 in advance. In the case that the sine function and the cosine function are calculated for angles of 0 to 45 degrees and the case that calculated for angles of 0 to 90 degrees. An example of the constant Kd and the shift number Sd stored in the constant table 16 are shown in FIG. 6.

In the constant table 16 of FIG. 6, values of the constant Kd and the shift numbers Sd in the cyclic equation of equation (1) are shown corresponding to the parameters d and $(2\pi)^d/d!$ of the Taylor series equation for each of the sine function and the cosine function, and the shift numbers Sd are divided into the case of calculating up to 45 degrees and the case of calculating up to 90 degrees and stored.

Figure 7:
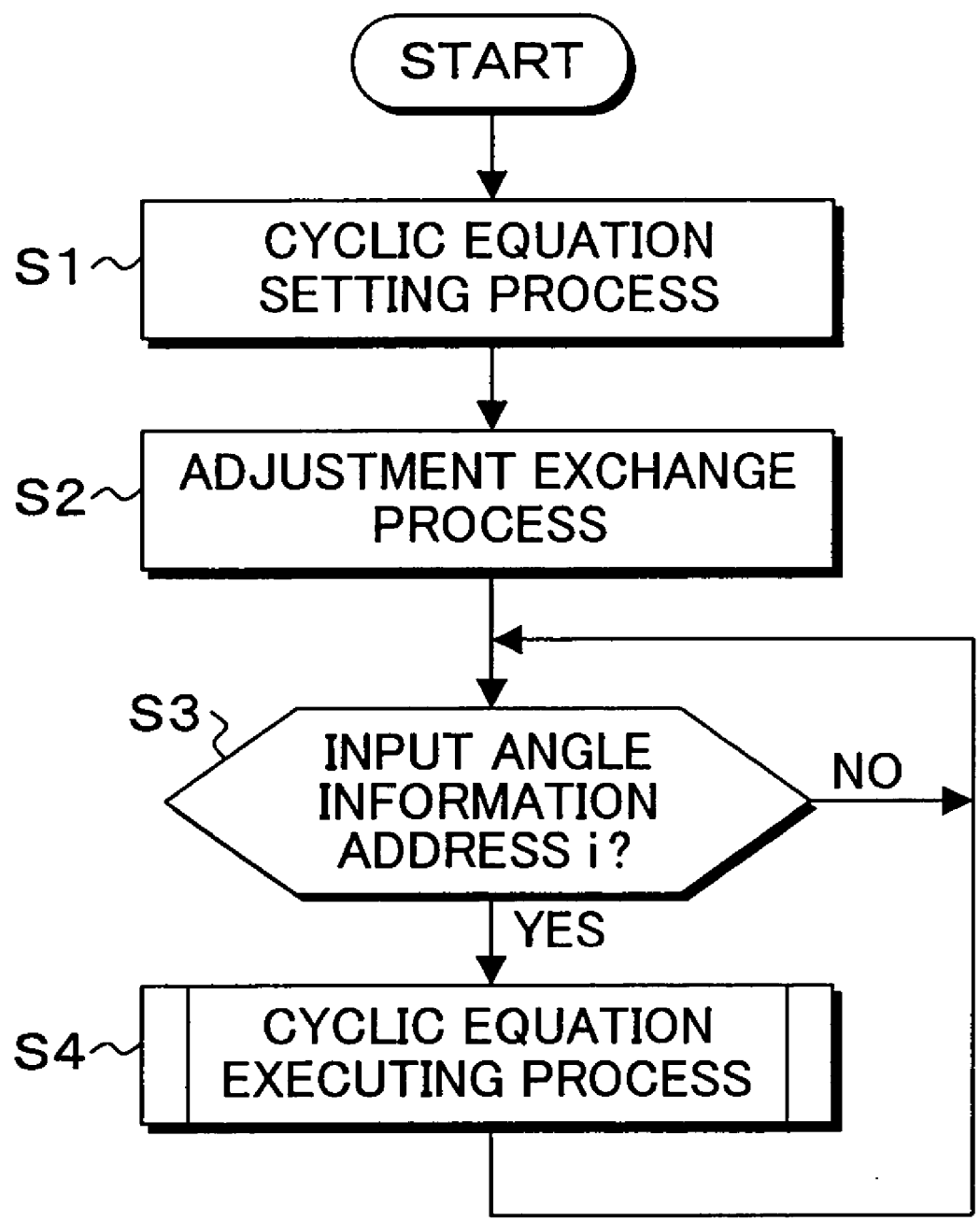
FIG. 7 is a flowchart of a function arithmetic process of FIG. 5.

FIG. 7 is a flowchart of a process procedure of the function arithmetic processing unit 12 according to the present invention achieved by program control of the computer 11 of FIG. 5.

In this function arithmetic process, after a setting process of the cyclic equation of the equation (1) is performed in step S1, by adjusting the shift number Sd in order to optimize the variable Xi and the constant Kd in step 2, the table 16 such as shown in FIG. 6 are generated. If preparation processes in steps S1 and S2 are completed, an input of the angle information address i from the angle detection unit 10 is checked in step S3, and if there is the input of the address i, proceed to step S4, and the address i as the angle information is converted to the variable Xi, and the sine function sin θ i for the angle θ i of the address i is calculated by executing the cyclic equation from higher order term to lower order term for the number of terms of the Taylor series equation. A transform process from the Taylor series equation to the cyclic equation of the equation (1) is then described. In the function arithmetic process of the present invention is divided into the case that the sine function and the cosine function are calculated up to an angle of 45 degrees and the case that these are calculated up to an angle of 90 degrees. At this point, the sine function and the cosine function in the range of angles 90 to 180 degrees can be easily found from the sine function of angles 0 to 90 degrees which is the arithmetic result, and the function arithmetic according to the present invention is not needed for these. In other words, formulas of trigonometric functions, which are:

$\cos(\alpha+\beta) = \cos\alpha \cdot \cos\beta - \sin\alpha \cdot \sin\beta$ $\sin(\alpha+\beta) = \cos\alpha \cdot \sin\beta + \sin\alpha \cdot \cos\beta$ can be used to derive these. These formulas of trigonometric functions are transformed into following equations.

$\cos(90°+\beta) = \cos 90° \cdot \cos\beta - \sin 90° \cdot \sin\beta = 0 \cdot \cos\beta - 1 \cdot \sin\beta = -\sin\beta$ $\sin(90°+\beta) = \cos 90° \cdot \sin\beta + \sin 90° \cdot \cos\beta = 0 \cdot \sin\beta + 1 \cdot \cos\beta = \cos\beta$ For example, in the case of an angle of 120 degrees, since $90° + \beta = 120°$, $\beta = 30°$ is derived.

Therefore:

$\cos 120° = -\sin 30°$; and $\sin 120° = \cos 30°$ can be found. The sine function and the cosine function in the range of angles 45 to 90 degrees can also be easily found from the sine function and the cosine function of angles 0 to 45 degrees which is found by the function arithmetic of the present invention. In other words, these can be derived from following equations which are formulas of trigonometric functions.

$\cos(\alpha-\beta) = \cos\alpha \cdot \cos\beta + \sin\alpha \cdot \sin\beta$ $\sin(\alpha-\beta) = -\cos\alpha \cdot \sin\beta + \sin\alpha \cdot \cos\beta$ These formulas of trigonometric functions are transformed into following equations.

$\cos(90°-\beta) = \cos 90° \cdot \cos\beta + \sin 90° \cdot \sin\beta = 0 \cdot \cos\beta + 1 \cdot \sin\beta = \sin\beta$ $\sin(90°-\beta) = -\cos 90° \cdot \sin\beta + \sin 90° \cdot \cos\beta = -0 \cdot \sin\beta + 1 \cdot \cos\beta = \cos\beta$ For example, in the case that the sine function and the cosine function of an angle of 60 degree, since $90° - \beta = 60°$, $\beta = 30°$ is derived.

Therefore:

$\cos 60° = \sin 30°$; and $\sin 60° = \cos 30°$ can be found.

Described here is transformation to the cyclic equation in the case that the sine function and the cosine function for angles 0 to 45 degrees are found. Since the angle address i is within the range of angles 0 to 45 degrees, the value of the address varies from 0 to N/8. Since the address i represents the i-th angle θ i in the case that angles 0 to 360 degrees are divided equally into N, this is given by following equation.

$$\theta i = 2\pi i / N \qquad (2)$$

Using the equation (2) which indicates the angle θ i, the Taylor series equation is developed as follows.

$$\begin{aligned}
\sin\theta i &= \theta i - (\theta i^3/3!) + (\theta i^5/5!) - (\theta i^7/7!) + (\theta i^9/9!) - \ldots \\
&= (2\pi i/N) - \{(2\pi i/N)^3/3!\} + \{(2\pi i/N)^5/5!\} - \\
&\quad \{(2\pi i/N)^7/7!\} + \ldots \\
&= 2\pi i/\{8 \cdot (N/8)\} - [2\pi i/\{8 \cdot (N/8)\}]^3/3! + \\
&\quad [2\pi i/\{8 \cdot (N/8)\}]^5/5! - \{2\pi i/\{8 \cdot (N/8)\}]^7/7! + \ldots \\
&= \{i/(N/8) \cdot 2\pi/2^3 - \{i/(N/8)\}^3 \cdot \{(2\pi)^3/3!\}/2^9 + \\
&\quad \{i/(N/8)\}^5 \cdot \{(2\pi)^5/5!\}/2^{15} - \{i/(N/8)\}^7 \cdot \\
&\quad \{(2\pi)^7/7!\}/2^{21} + \ldots
\end{aligned}$$

In this development of the Taylor series equation, a first row is the original Taylor series equation, and in a second row, the value of θ i of the equation (2) is substituted in the equation. In third and fourth rows of the equation, by substituting N=8(N/8), it is transformed into exponentiation of 2. In fifth and sixth rows, portions in brackets are divided into the variable portions and the constant portions.

In the present invention, the constant Kd of the cyclic equation of the equation (1) will be a value which is not greater than 1 and close to 1 as much as possible. For example, by dividing $2\pi = 6.28$ in the first term of fifth and sixth rows in the transformed equation of the Taylor series equation by $2^3=8$, $K1=0.785$ can be derived. In other words, if $2\pi=6.28$ is divided by $2^2=4$, $K1=1.57$ is derived, which can not be adopted because this is greater than 1, and if divided by $2^4=16$, $K1=0.3925$ is derived, which is far from 1, and therefore, by dividing by $2^3=8$, the constant $K1$ can be a value which is not greater than 1 and close to 1 as much as possible. The constants of the transformed equation of the Taylor series equation can be summarized as following equation.

$$\sin\theta i = \{i/(N/8)\} \cdot [2\pi/2^3] -$$
$$\{i/(N/8)\}^3 \cdot [(2\pi)^3/(3! \cdot 2^6)]/2^3 + \{i/(N/8)\}^5 \cdot [(2\pi)^5/(5! \cdot 2^7)]/2^8 -$$
$$\{i/(N/8)\}^7 \cdot [(2\pi)^7/(7! \cdot 2^7)]/2^{14} + \ldots$$

For this equation, the constants $K1, K3, K5$ and $K7$ are defined as follows.

$$K1=[2\pi/2^3]$$
$$K3=-[(2\pi)^3/(3! \cdot 2^6)]$$
$$K5=[(2\pi)^5/(5! \cdot 2^7)]$$
$$K7=-[(2\pi)^7/(7! \cdot 2^7)]$$

By transforming, using the constants $K1$, $K3$, $K5$ and $K7$, following equation can be obtained.

$$\sin\theta i = \{i/(N/8)\} \cdot K1 + \{i/(N/8)\}^3 \cdot K3/2^3 + \{i/(N/8)\}^5 \cdot$$
$$K5/2^8 + \{i/(N/8)\}^7 \cdot K7/2^{14} + \ldots$$
$$= \{i/(N/8)\} \cdot [K1 + \{i/(N/8)\}^2 \cdot K3/2^3 + \{i/(N/8)\}^4 \cdot$$
$$K5/2^8 + \{i/(N/8)\}^6 \cdot K7/2^{14} + \ldots]$$
$$= \{i/(N/8)\} \cdot [K1 + 2^{-3} \cdot \{i/(N/8)\}^2 \cdot [K3 + \{i/(N/8)\}^2 \cdot$$
$$K5/2^5 + \{i/(N/8)\}^4 \cdot K7/2^{11} + \ldots]]$$
$$= \{i/(N/8)\} \cdot [K1 + 2^{-3} \cdot \{i/(n/8)\}^2 \cdot [K3 + 2^{-5} \cdot$$
$$\{i/(N/8)\}^2 \cdot [K5 + \{i/(N/8)\}^2 \cdot K7/2^6 + \ldots]]]$$
$$= \{i/(N/8)\}^2 \cdot [K1 + 2^{-3} \cdot \{i/(N/8)\}^2 \cdot [K3 + 2^{-5} \cdot$$
$$\{i/(N/8)\}^2 \cdot [K5 + 2^{-6} \cdot \{i/(N/8)\}^2 \cdot [K7 + \ldots]]]]$$

In this transformed equation, the constants $K1$, $K3, K5$ and $K7$ are substituted in a first row, and $\{i/(N/8)\}$ are bundled out for the portion in brackets in a second row. In third and fourth rows, $2^{-3}$ is bundled for first and second terms in braces on the right side. In fifth and sixth rows, $2^{-5}$ is further bundled for the second term and subsequent terms in that. Finally, in a seventh row, $2^{-6}$ is bundled for the third term. For the above transformed equation, when as variable $Xi$:

$$Xi = i/(N/8)$$

is defined, and as bit shift numbers $S3, S5$ and $S7$:

$$S3 = 2^{-3}$$
$$S5 = 2^{-5}$$
$$S7 = 2^{-6}$$

are defined, and as known numbers $Q7, Q5, Q3$ and $Q1$:

$$Q7 = K7 + \ldots$$

$$Q5 = K5 + S7 \cdot Xi^2 \cdot [Q7]$$
$$Q3 = K3 + S5 \cdot Xi^2 \cdot [Q5]$$
$$Q1 = K1 + S3 \cdot Xi^2 \cdot [Q3]$$

are defined, following equation can be obtained.

$$\sin\theta i = Xi \cdot [K1 + S3 \cdot Xi^2 \cdot [K3 + S5 \cdot Xi^2 \cdot [K5 + S7 \cdot Xi^2 \cdot$$
$$[K7 + \ldots ]]]]$$
$$= Xi \cdot [K1 + S3 \cdot Xi^2 \cdot [K3 + S5 \cdot Xi^2 \cdot [K5 + S7 \cdot Xi^2 \cdot$$
$$[Q7]]]]$$
$$= Xi \cdot [K1 + S3 \cdot Xi^2 \cdot [K3 + S5 \cdot Xi^2 \cdot [Q5]]]$$
$$= Xi \cdot [K1 + S3 \cdot Xi^2 \cdot [Q3]]$$
$$= Xi \cdot [Q1]$$

The cyclic portion of the sine function in this transformed equation takes values of $d=1, 3, 5, 7 \ldots$, and following equation is given, which is the same as the equation (1).

$$Qd = Kd + S(d+2) \cdot Xi^2 \cdot [Q(d+2)]$$

Therefore, in calculation of $\sin\theta$ unit with the use of this cyclic equation, the sine function $\sin\theta i$ can be found by sequentially calculating the cyclic equation in the order of $d=7, 5, 3$ and $1$ to find $Q7, Q5, Q3$ and $Q1$ and finally multiplying by $Xi$. For $Q7$ as an initial value, the constant $K7$ is used.

Similarly, transform from the Taylor series equation to the cyclic equation for the cosine function Is described as follows. By substituting the equation (2) in the Taylor series equation of $\cos\theta i$, the transformed equation becomes as follows.

$$\cos\theta i = 1 - (\theta i^2/2!) + (\theta i^4/4!) - (\theta i^6/6!) + (\theta i^8/8!) - \ldots$$
$$= 1 - \{(2\pi i/N)^2/2!\} + \{(2\pi i/N)^4/4!\} -$$
$$\{(2\pi i/N)^6/6!\} + \ldots$$
$$= 1 - \{2\pi i/\{8 \cdot (N/8)\}\}^2/2! + [2\pi i/\{8 \cdot (N/8)\}]^4/4! -$$
$$\{2\pi i/\{8 \cdot (N/8)\}\}^6/6! + \ldots$$
$$= 1 - (i/(N/8))^2 \cdot \{(2\pi)^2/2!\}/2^6 + \{i/(N/8)\}^4 \cdot$$
$$\{(2\pi)^4/4!\}/2^{12} - \{i/(N/8)\}^6 \cdot \{(2\pi)^6/6!\}/2^{18} + \ldots$$
$$= 1 - \{i/(N/8)\}^2 \cdot [(2\pi)^2/(2! \cdot 2^5)]/2^1 + \{i/(N/8)\}^4 \cdot$$
$$[(2\pi)^4/(4! \cdot 2^7)]/2^5 - \{i/(N/8)\}^6 \cdot [(2\pi)^6/(6! \cdot 2^7)]/2^{11} + \ldots$$

By defining constants $K0, K2, K4$ and $K6$ as:

$$K0 = 1$$
$$K2 = -[(2\pi)^2/(2! \cdot 2^5)]$$
$$K4 = [(2\pi)^4/(4! \cdot 2^7)]$$
$$K6 = -[(2\pi)^6/(6! \cdot 2^7)]$$

and transforming, following equation is given.

$$\cos\theta i = K0 + \{i/(N/8)\}^2 \cdot K2/2^1 + \{i/(N/8)\}^4 \cdot K4/2^5 +$$
$$\{i/(N/8)\}^6 \cdot K6/2^{11} + \ldots$$
$$= K0 + 2^{-1} \cdot \{i/(N/8)\}^2 \cdot [K2 + \{i/(N/8)\}^2 \cdot K4/2^4 +$$
$$\{i/(N/8)\}^4 \cdot K6/2^{10} + \ldots ]$$
$$= K0 + 2^{-1} \cdot \{i/(N/8)\}^2 \cdot [K2 + 2^{-4} \cdot \{i/(N/8)\}^2 \cdot$$
$$[K4 + \{i/(N/8)\}^2 \cdot K6/2^6 + \ldots ]]$$
$$= K0 + 2^{-1} \cdot \{i/(N/8)\}^2 \cdot [K2 + 2^{-4} \cdot \{i/(N/8)\}^2 \cdot$$
$$[K4 + 2^{-6} \cdot \{i/N/8)\}^2 \cdot [K6 + \ldots ]]]$$

At this point, by defining the variable Xi as:

$$Xi = i/(N/8)$$

and the shift numbers S2, S4 and S6 as:

$$S2 = 2^{-1}$$
$$S4 = 2^{-4}$$
$$S6 = 2^{-6}$$

and the known number Q6, Q4, Q2 and Q0 as:

$$Q6 = K6 + \ldots$$
$$Q4 = K4 + S6 \cdot Xi^2 \cdot [Q6]$$
$$Q2 = K2 + S4 \cdot Xi^2 \cdot [Q4]$$
$$Q0 = K0 + S2 \cdot Xi^2 \cdot [Q2]$$

it is possible to transform to following equation.

$$\cos\theta i = K0 + S2 \cdot Xi^2 \cdot [K2 + S4 \cdot Xi^2 \cdot [K4 + S6 \cdot Xi^2 \cdot [K6 + \ldots ]]]$$
$$= K0 + S2 \cdot Xi^2 \cdot [K2 + S4 \cdot Xi^2 \cdot [K4 + S6 \cdot Xi^2 \cdot [Q6]]]$$
$$= K0 + S2 \cdot Xi^2 \cdot [K2 + S4 \cdot Xi^2 \cdot [Q4]]$$
$$= K0 + S2 \cdot Xi^2 \cdot [Q2]$$
$$= Q0$$

The cyclic portion of the cosine function in this transformed equation of the Taylor series equation takes values of $d = 0, 2, 4, 6 \ldots$, and the cyclic equation which is common to terms of the Taylor series equation is:

$$Qd = Kd + S(d+2) \cdot Xi^2 \cdot [Q(d+2)]$$

which is the same as the equation (1).

Figure 8:
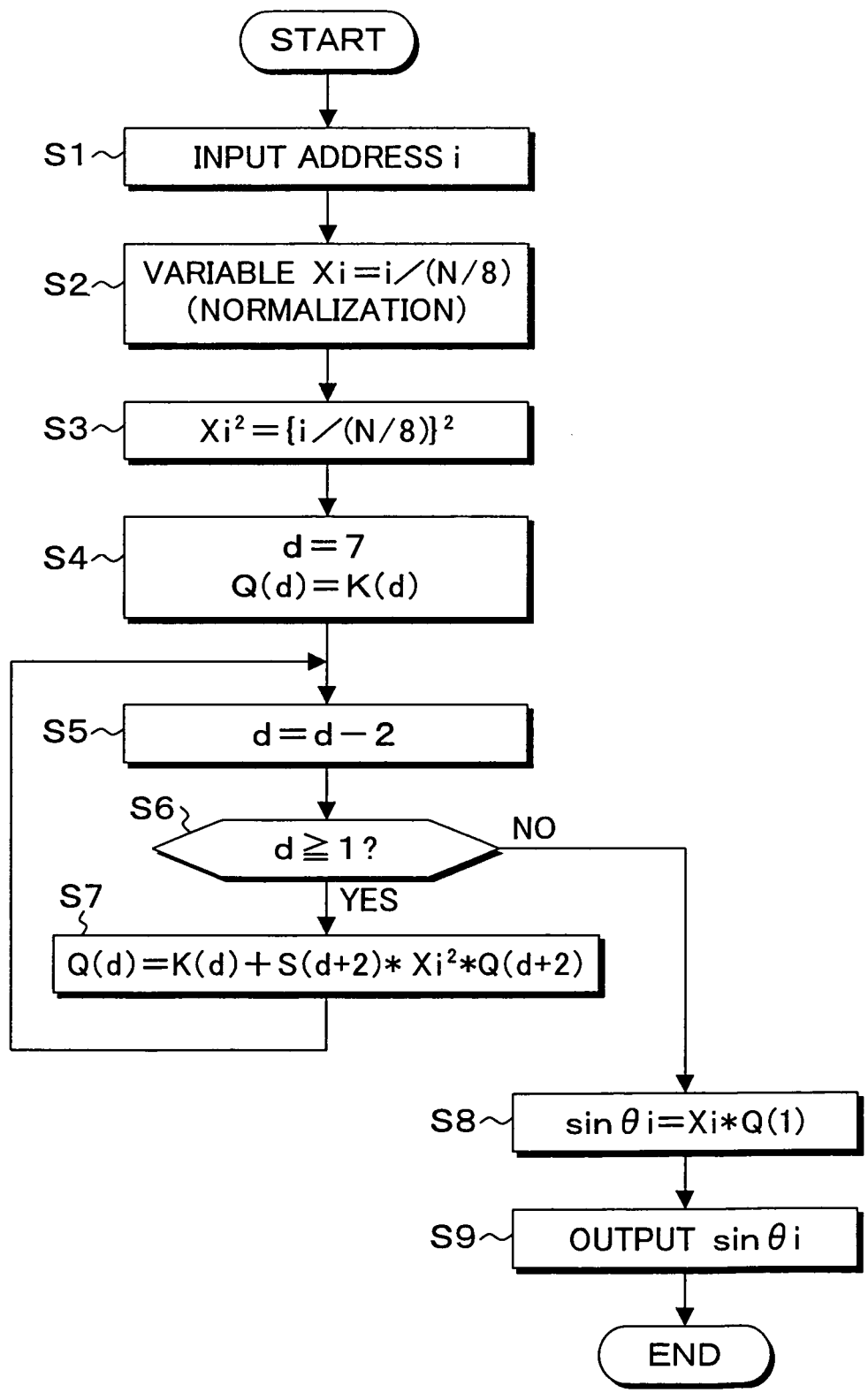
FIG. 8 is a flowchart of a sine function arithmetic process of FIG. 5.

FIG. 8 is a flowchart of a sine function arithmetic process in the cyclic equation executing unit 15 of FIG. 5, and the process procedure is as follows.

Step S1: Input the address i which indicates angles.

Step S2: Since calculation from 0 to 45 degrees is performed with the address i, define the variable Xi as Xi=i/(N/8) and normalize such that the maximum value results in 1.

Step S3: Calculate the square of the variable Xi.

Step S4: Set d=7 which is the number of terms indicating termination of the Taylor series equation, find the constant K(7) from the constant table 16 of FIG. 6 and substitute this for the known number Q(7).

Step S5: Define d as d=d−2.

Step S6: Check whether d is not less than 1. If it is not less than 1, proceed to step S7, and if less than 1, proceed to step S8.

Step S7: Sequentially calculate the cyclic equation in the order of D=5, 3, 1, through the route of steps S5 to S7, for the known number Q5, Q3 and Q1.

Step S8: This is the case that arithmetic of the cyclic equation is terminated because d becomes less than 1, and therefore, by multiplying the known number Q(1) by the variable Xi, sin θ i is calculated.

Step S9: Output the calculated value of sin θ i.

Figure 9:
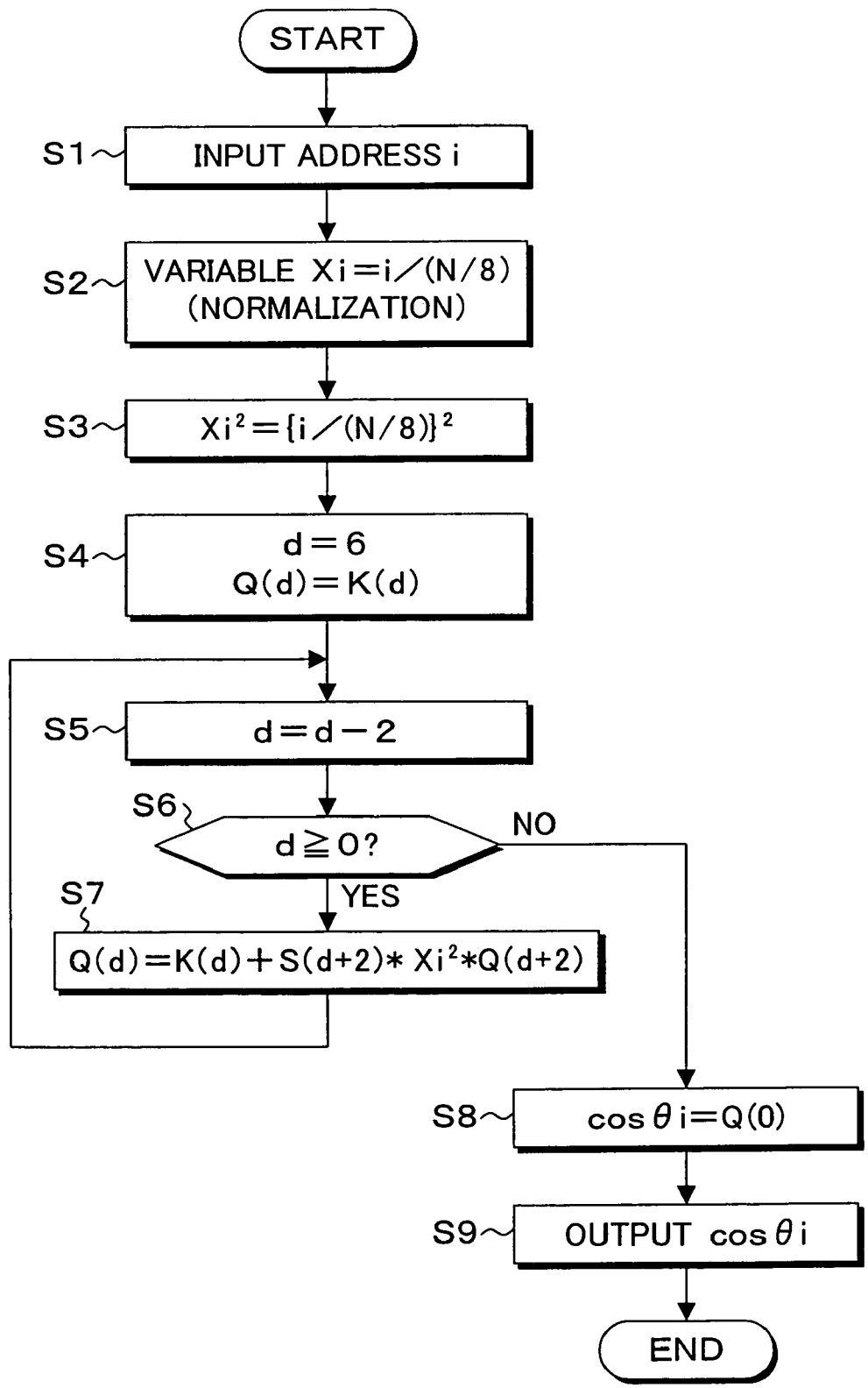
FIG. 9 is a flowchart of a cosine function arithmetic process of FIG. 5.

FIG. 9 is a flowchart of a cosine function arithmetic process of the present invention of FIG. 5. The function arithmetic process is as follows.

Step S1: Input the address i which indicates angles.

Step S2: Divide the address i by (N/8) to find the variable Xi which is normalized such that the maximum value becomes 1.

Step S3: Calculate the square of the variable Xi.

Step S4: Set d=6 and substitute the constant K(d) pick up from t=6 on the cosine side of FIG. 6 for Q(6).

Step S5: Calculate d=d−2.

Step S6: Check whether d is not less than 0. If it is not less than 0, proceed to step S7, and if it is minus, proceed to step S8.

Step S7: Sequentially calculate the cyclic equation for d=4, 2, 0, through the route process of steps S5 to S7, to sequentially find Q(4), Q(2) and Q(0).

Step S8: This is the case that arithmetic of the cyclic equation is terminated because d becomes minus, and in this case, Q(0) which is found at the last in steps S5 to S7 is considered as cos θ i.

Step S9: Output the value of cos θ i found by the arithmetic process.

Figure 10:
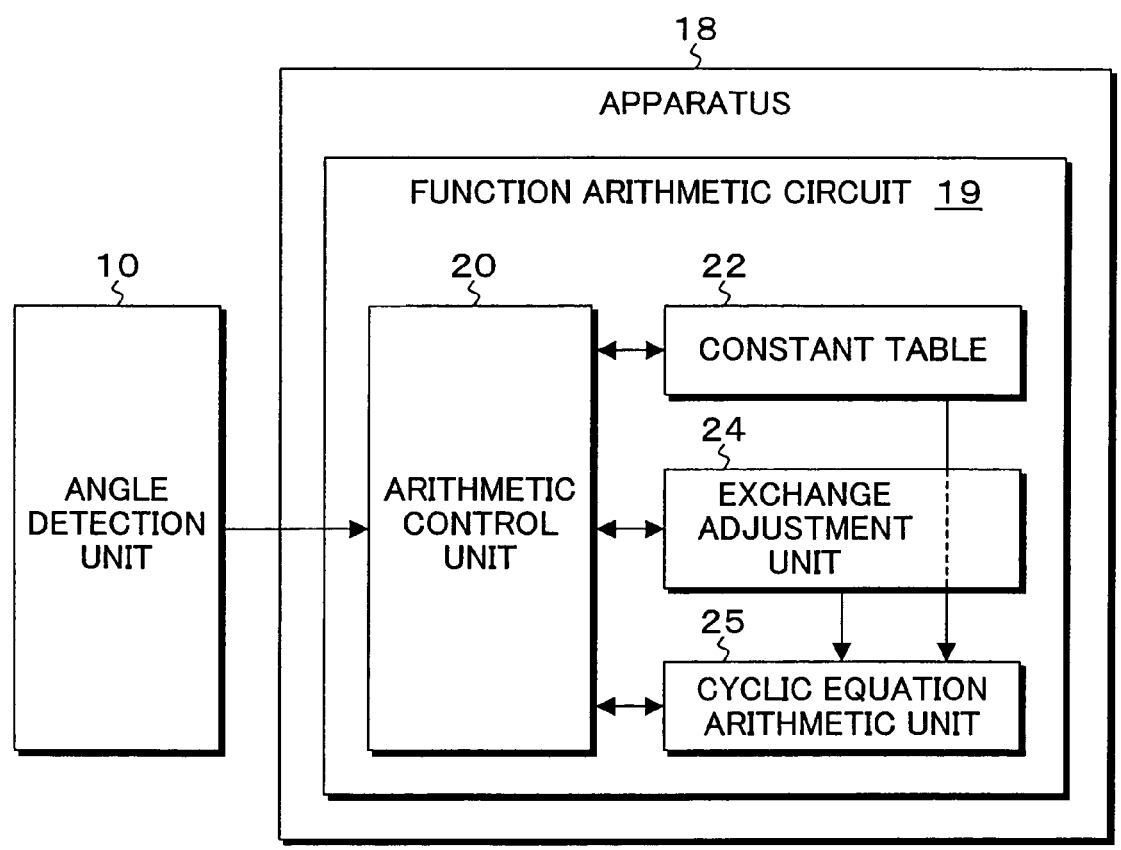
FIG. 10 is a block diagram of a function arithmetic circuit of the present invention achieved by hardware.

FIG. 10 is a block diagram of a function arithmetic circuit of the present invention achieved by hardware, and the function arithmetic of the present invention achieved by the program control by the computer, which is shown by the embodiment of FIG. 5, is achieved by hardware. In FIG. 10, the function arithmetic apparatus of the present invention consists of the angle detection unit 10 and any apparatus 18, and the apparatus is provided with a function arithmetic circuit 19. The function arithmetic circuit 19 consists of an arithmetic control unit 20, a constant table 22, a conversion adjustment unit 24 and a cyclic equation arithmetic unit 25. In the constant table 22, the shift umbers Sd and the constants Kd of sine and cosine, which are needed for calculation up to, for example, 45 degrees in the constant table 16 of FIG. 6, is stored for necessary values out of d, for example, d=1, 3, 5, 7 of sin and d=0, 2, 4, 6 of cos. The conversion adjustment unit converts the address i input from the angle detection unit 10 into the variable Xi, adjusts the shift number such that a maximum value of the variable Xi becomes 1 within a transform range and outputs it. The cyclic arithmetic unit 25 calculates the cyclic equation obtained by transforming the Taylor series equation which calculates the sine function and the cosine function, in which the new known number Qd is considered as the number obtained by multiplying the known number d by the square of the variable Xi and adding the constant Kd after shifting the results by the shift number Sd. The arithmetic control unit 20 forces the cyclic equation arithmetic unit 25 to sequentially perform cyclic arithmetic based on the selection of the constant Kd and the shift number Sd of the constant table 22, from higher order term to lower order term, for the number of terms of the Taylor series equation defined in advance when the variable Xi is output from the conversion adjustment unit 24 and forces it to calculate the sine function sin θ i and the cosine function cos θ i of the address i.

Figure 1:
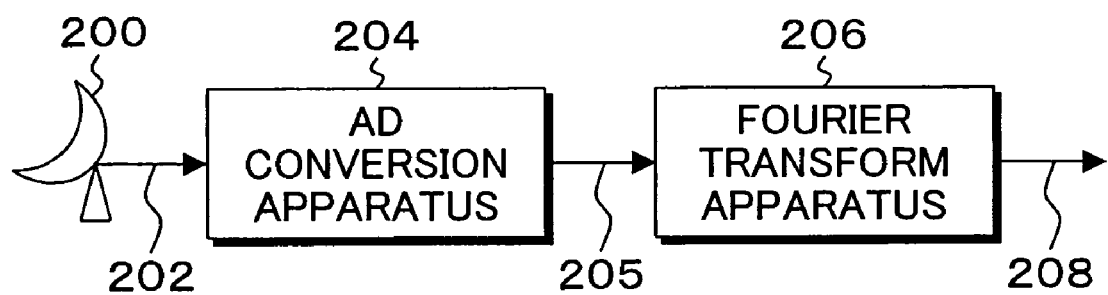
FIG. 1 is an explanatory view of a system using a conventional fast Fourier transform apparatus.
Figure 2A:
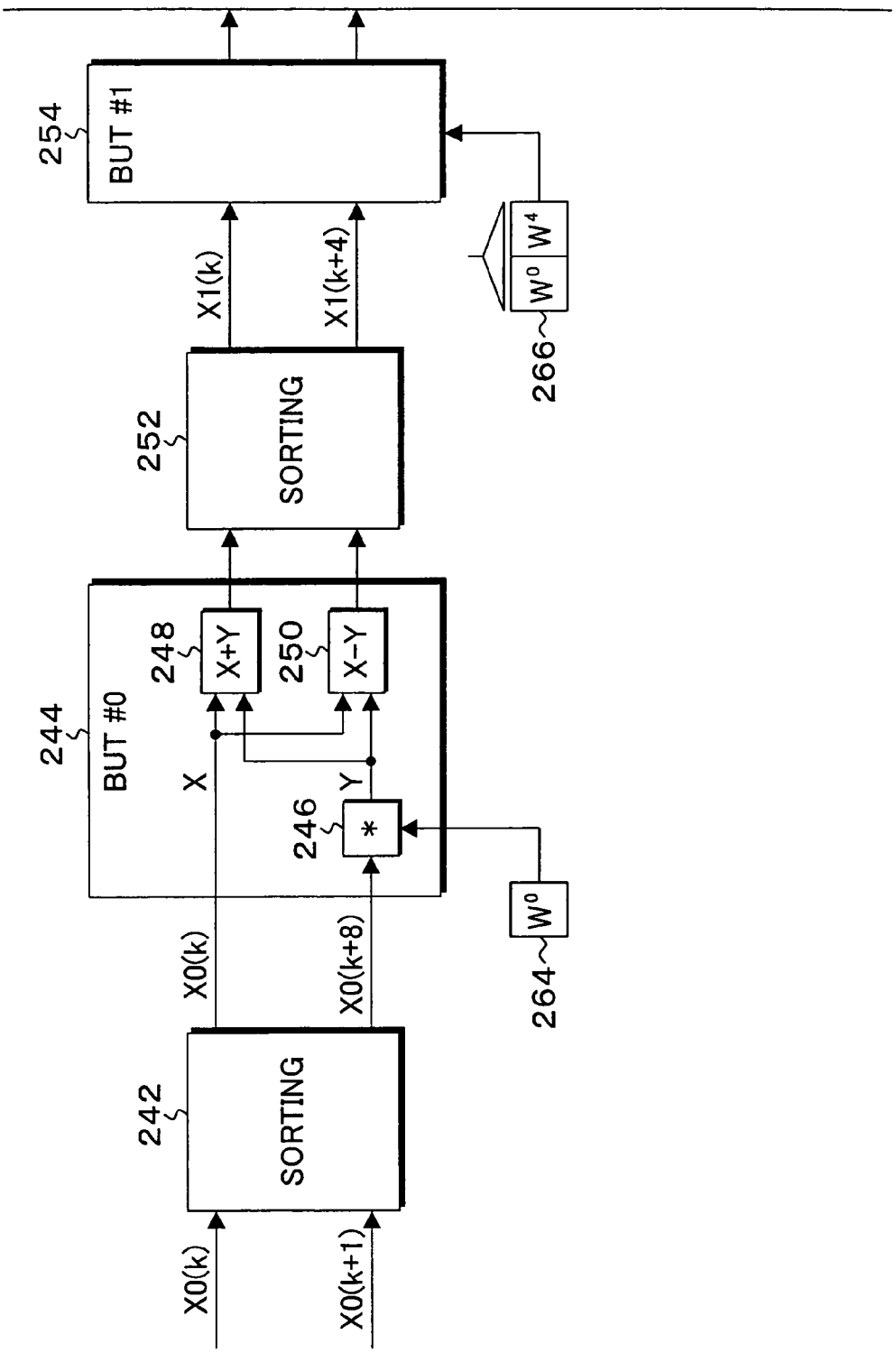
FIGS. 2A and 2B are block diagrams of a conventional fast Fourier transform apparatus holding a twist coefficient in memory.
Figure 2B:
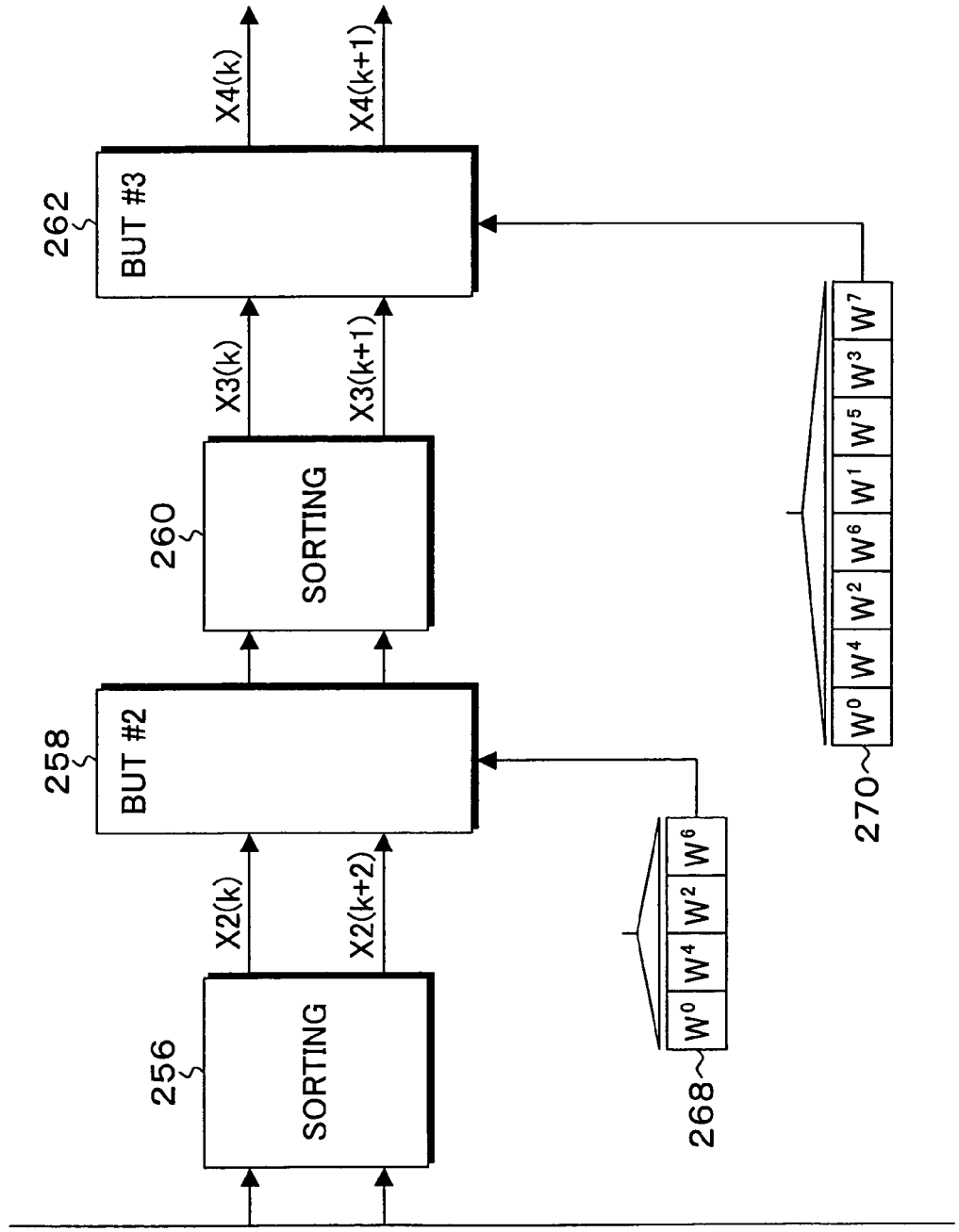
Figure 3:
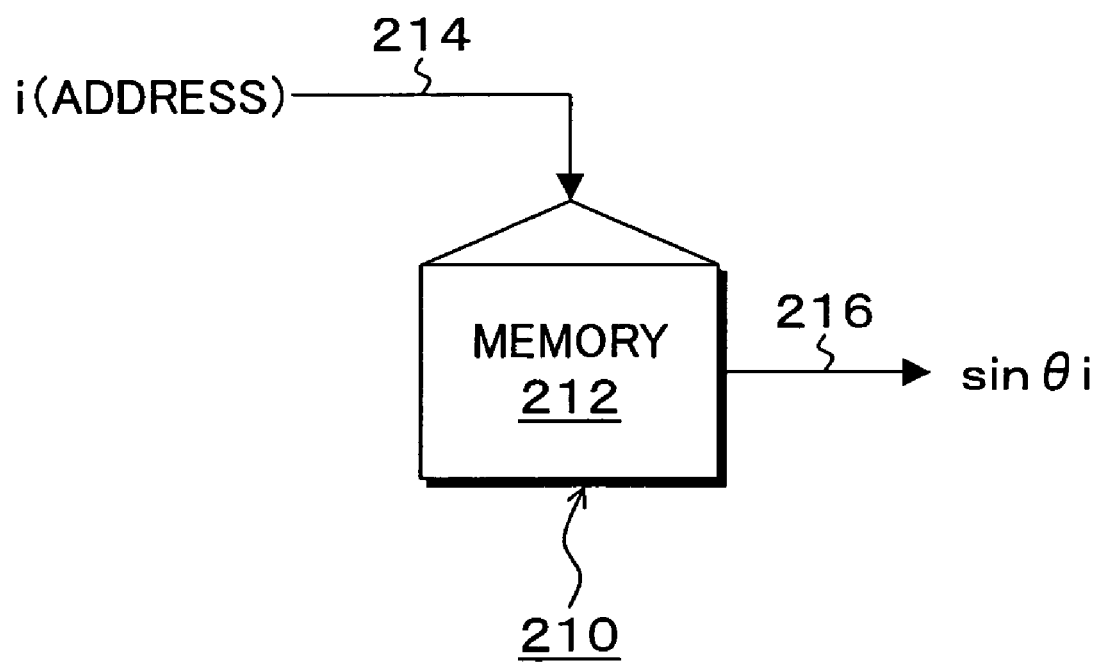
FIG. 3 is an explanatory view of a look-up table which converts angle information address i into a sine function or a cosine function.
Figure 4:
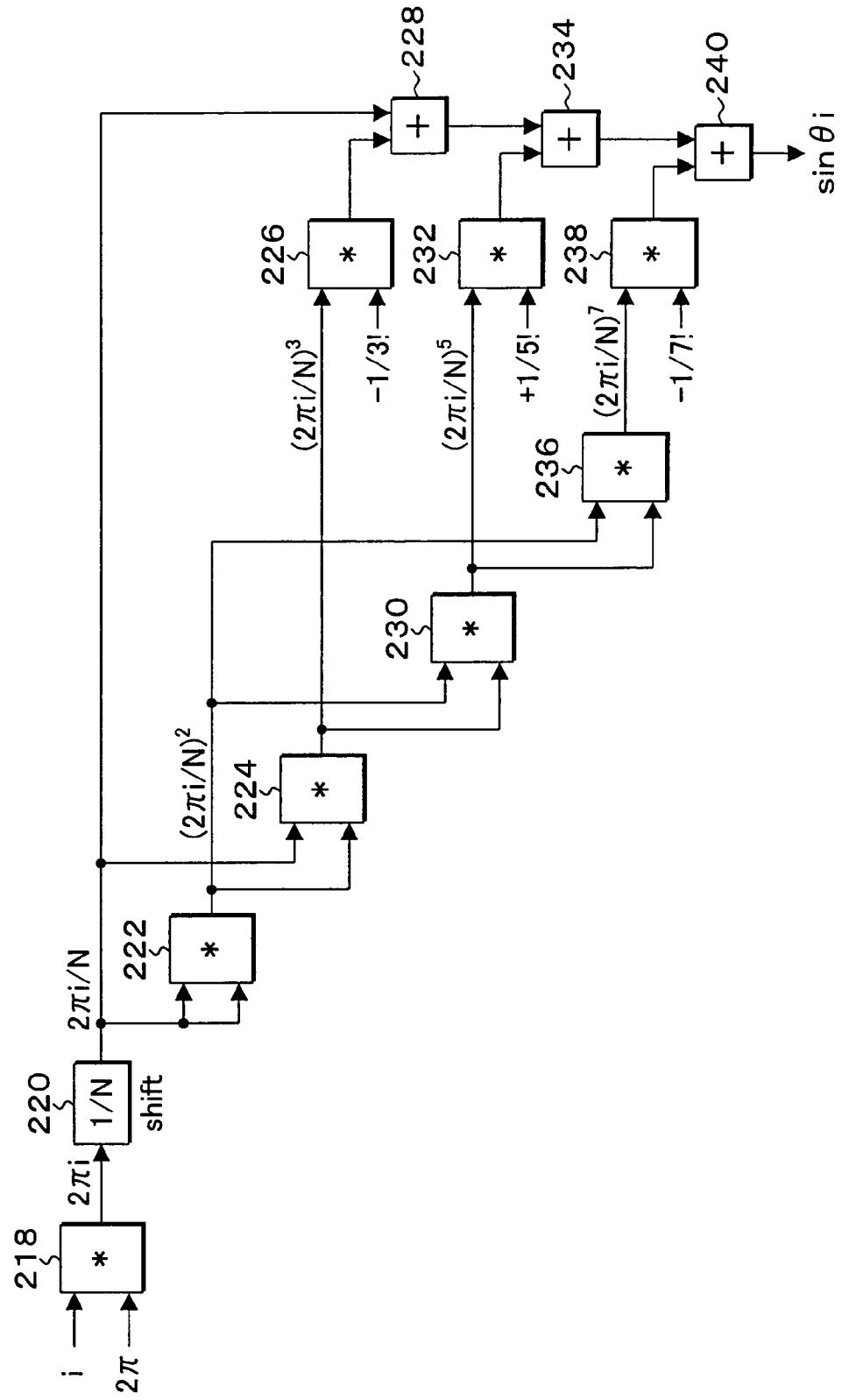
FIG. 4 is a circuit diagram as simple hardware which calculates a sine function by the use of the Taylor series equation.
Figure 11:
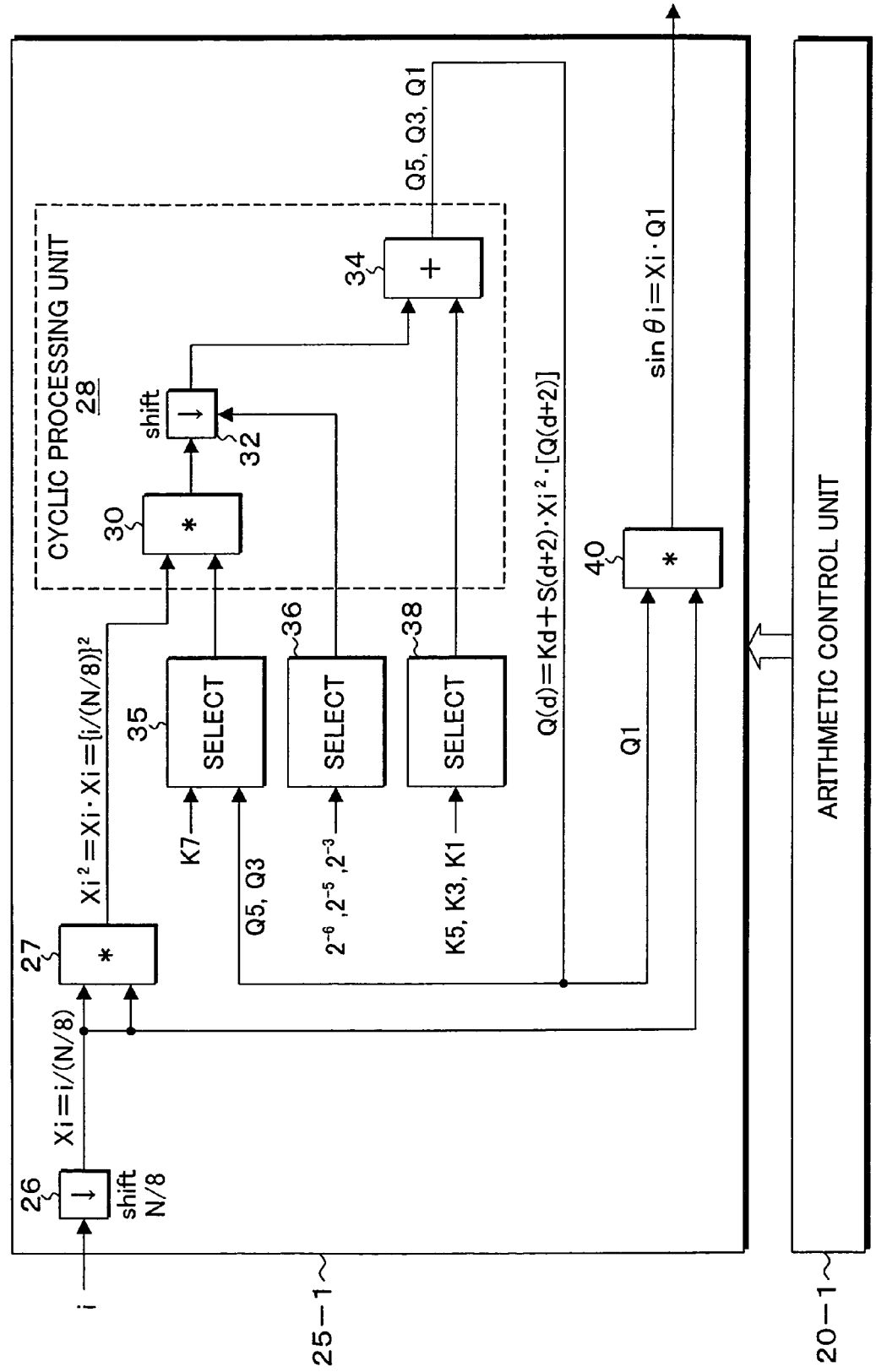
FIG. 11 is a circuit block diagram of a sine function arithmetic circuit provided in FIG. 10.

FIG. 11 is a circuit block diagram of a sine function arithmetic circuit used in FIG. 10. In FIG. 11, the sine function arithmetic circuit 25-1 consists of a conversion shift circuit 26, multipliers 27, 30 and 40, an adder 34 and selection circuits 35, 36 and 38, and a shift circuit 32 and the adder 34 constitute a cyclic processing unit 28 which repeats calculation of the cyclic equation. The sine function arithmetic circuit 25-1 is provided with an arithmetic control unit 20-1. The conversion shift circuit 26 converts the input address i into the variable of $Xi=i/(N/8)$ by shifting the bits by (N/8). The multiplier 27 finds the variable $Xi^2$. The cyclic processing unit 28 performs the multiplication of $Xi^2$ and Q(d+2) in the cyclic equation of the equation (1). The shift circuit 32 performs the shift of the shift number S(d+2) in the equation (1). The adder 34 performs the addition for adding the result of the shift circuit 32 to the constant Kd. The output of the adder 34 returns to the selection circuit 35. The selection circuit 35 selects the constant K7 in the first multiplication in the multiplier 30, selects the known number Q5 output from the adder 34 in the next multiplication and selects the known number Q3 output from the adder 34 in the third multiplication. The selection circuit 36 selects the shift number $S7=2^{-6}$ in the first shift, selects $S7=2^{-5}$ in the second shift operation and selects $S7=2^{-3}$ in the third shift operation. The selection circuit 38 selects the constant K5 in the first addition, selects the constant K3 in the second addition and selects the constant K1 in the third addition. The multiplier 40 multiplies the known number Q1, which is output after three (3) cyclic processes for d=5, 3, 1 in the cyclic processing unit 28 are completed, by the variable Xi, which is output by the conversion shift circuit 26, and outputs the result of the multiplication as sin θ i. This sine function arithmetic circuit 25-1 of the present invention only needs arithmetic processes of five (5) multiplications and three (3) additions by repeatedly using the cyclic processing unit 28. Contrary to this, in the case of the conventional example shown in FIG. 4, eight (8) multiplications and three (3) additions are needed, and the sine function arithmetic circuit 25-1 using the cyclic equation according to the present invention can find the result with fewer arithmetic processes. Also, since the selection circuit and the shift circuit has smaller circuit scale as hardware than the addition circuit and the multiplication circuit, in the sine function arithmetic circuit 25-1 according to the present invention, the hardware scale can be configured smaller and easier than the conventional hardware.

Figure 12:
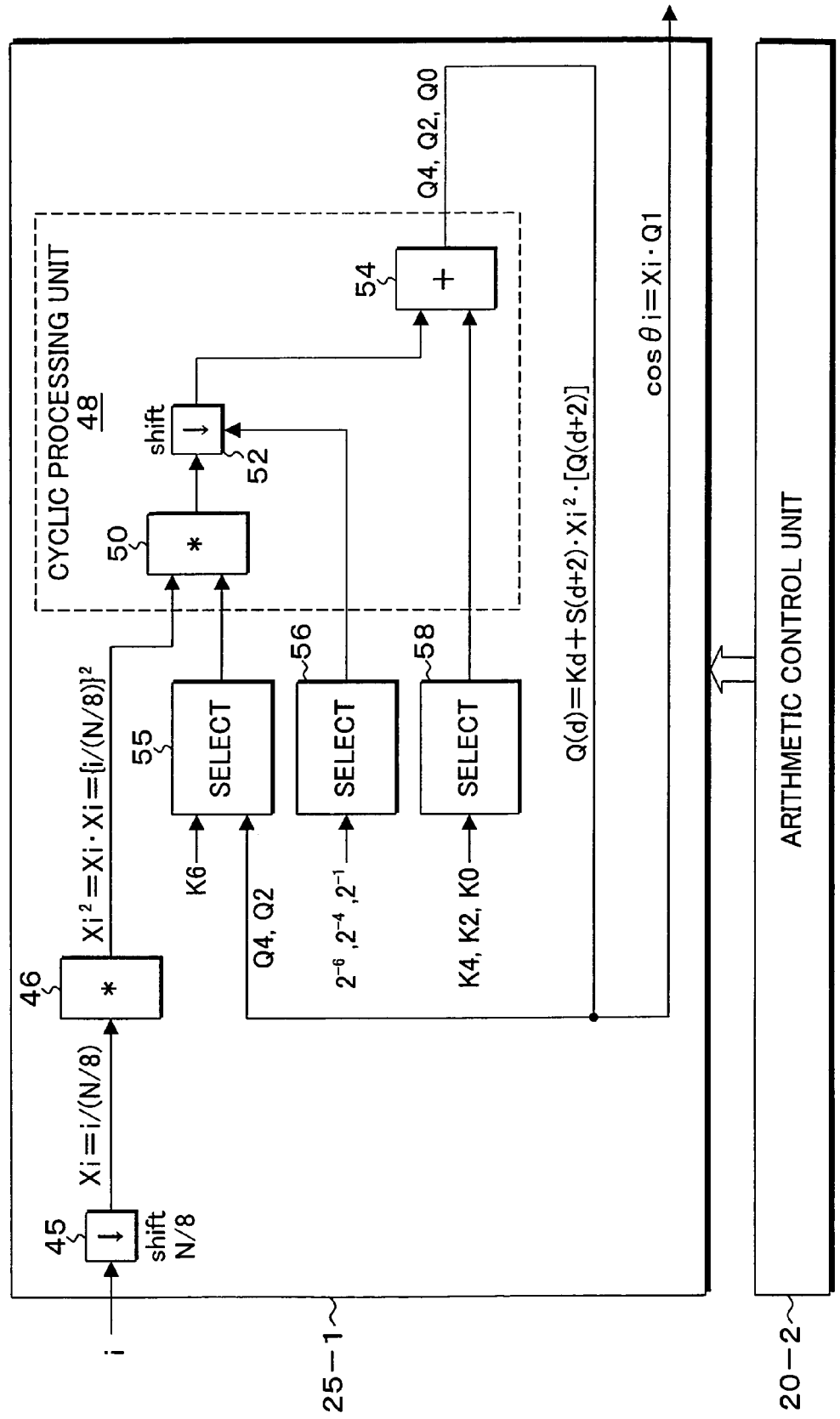
FIG. 12 is a circuit block diagram of a cosine function arithmetic circuit provided in FIG. 10.

FIG. 12 is a circuit block diagram of a cosine function arithmetic circuit 25-2 in FIG. 10. The cosine function arithmetic circuit 25-2 consists of a conversion shift circuit 45, multipliers 46 and 50, an adder 46, a shift circuit 52, an adder 54 and selection circuits 55, 56 and 58. Among these, the multiplier 50, the shift circuit 52 and an adder 54 constitute the cyclic processing unit 48. Also, an arithmetic control unit 20-2 is provided, which controls an arithmetic process of the cosine function arithmetic circuit 25-2. When the address i is input, the cosine function arithmetic circuit 25-2 converts it into the variable $Xi=i/(N/8)$ with a (N/8) shift operation by the conversion shift circuit 45, and then the variable $Xi^2$ is found by the multiplier 46. The output of the multiplier 46 is input to the multiplier 50 of the cyclic processing unit 48 and multiplied by the known number Q(d+2) from the selection circuit 55. The output of the multiplier 50 is shifted in the shift circuit 52 based on the shift number S(d+2) from the selection circuit 56. The output of the shift circuit 52 is added in the adder 54 to the constant Kd selected from the selection circuit 58. The output of the adder 54 is input to the other selection circuit 55 and becomes final arithmetic output. The arithmetic control unit 20-2 performs cyclic arithmetic such that d=6, 4, 2, 0 is achieved following cyclic arithmetic of the equation (1) in the cyclic processing unit 48. In other words, in the first addition in the adder 50, the selection circuit 55 selects the constant K6 corresponding to d=6 to perform the addition, and subsequently, the selection circuit 56 selects the shift number $S6=2^{-6}$ for the shift circuit 52 to perform the shift, and the selection circuit 58 selects the constant K4 for the adder 54 to perform the addition output of the known number Q4. This addition output Q4 is returned and input to the selection circuit 55, selected for the second multiplication in the multiplier 50 and multiplied by $Xi^2$. Subsequently, the selection circuit 56 sets $S4=2^{-4}$ to the shift circuit 52 to perform the shift process, and the known number Q2 is found in the adder 54 by the addition with the constant K2 selected in the selection circuit 58. This addition output Q2 is input to the selection circuit 55 again, and in the third addition, the multiplier 50 multiplies $Xi^2$ by the known number Q2 from the selection circuit 55, and after the shift of $S2=2^{-1}$ selected by the selection circuit 56 is performed in the shift circuit 52, the addition with the constant K0 which is currently selected by the selection circuit 58 is performed in the adder 54 to find the addition output Q0. Since this addition output Q0 is a cosine function which is finally calculated, this is output as the arithmetic result.

Figure 13:
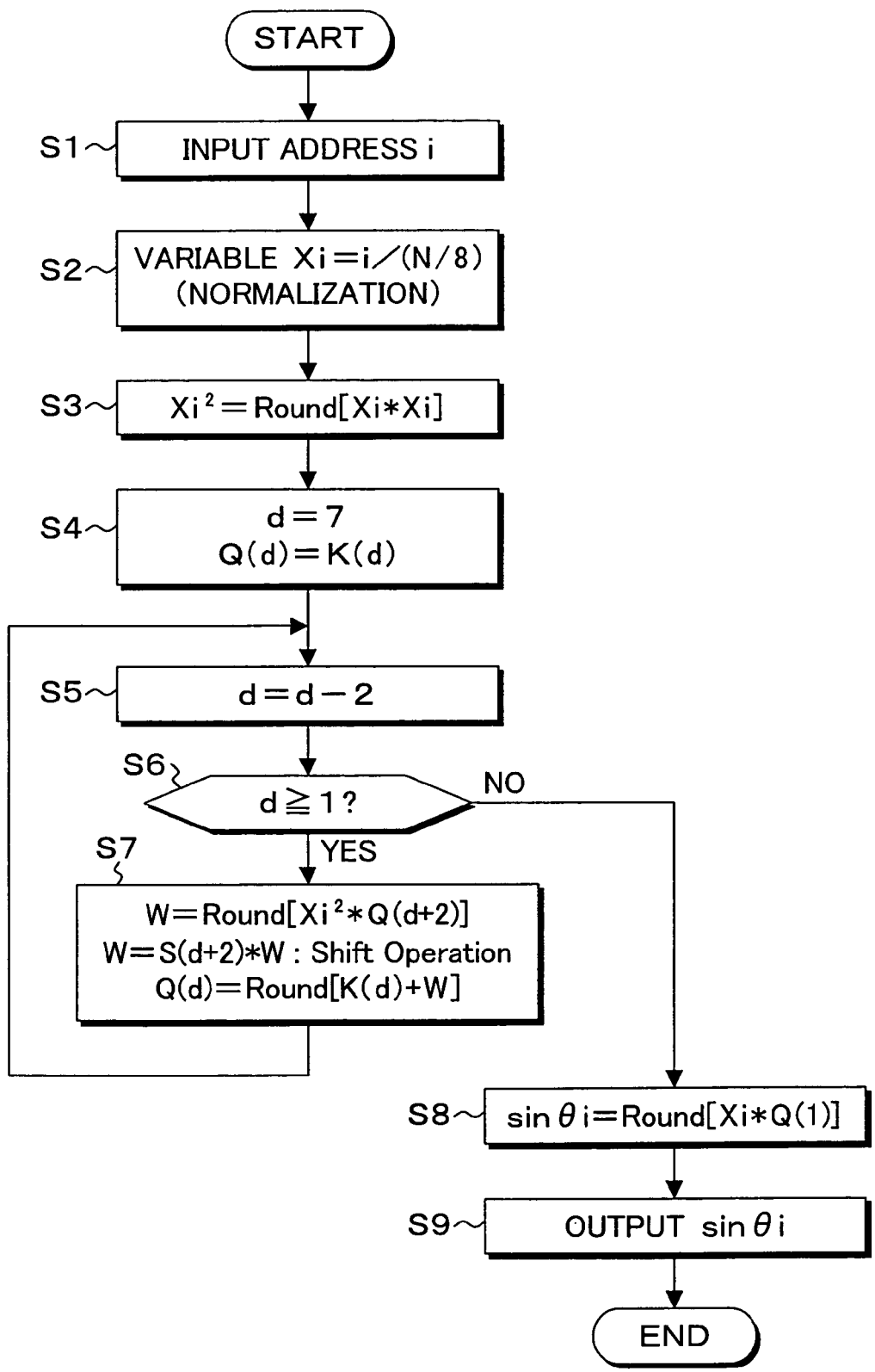
FIG. 13 is a flowchart of a sine function arithmetic process according to the present invention which keeps accuracy by rounding arithmetic results to which protect bits are added.

FIG. 13 is a flowchart of another embodiment of the sine function arithmetic process of the present invention in accordance with the function arithmetic processing unit 12 of FIG. 5 which keeps arithmetic accuracy by rounding arithmetic results to which protect bits are added. In this sine function arithmetic process of FIG. 13, for the known number Qd, the variable $Xi^2$, an intermediate value after the shift and the constant Kd, the cyclic calculation is performed with the number of bits which is obtained by adding the number of protect bits (guard bits) to the final number of the bits, and then the necessary final number of bits can be ensured by rounding the protect bit portion of the final value. With these arithmetic processes in which the protect bit portion of the final value is rounded after the cyclic calculation is performed with adding the number of the protect bits, it is possible to perform each calculation with the same bit accuracy as fixed-point arithmetic, and in the software process of FIG. 13, the processing load can be reduced because it is fixed-point arithmetic, and the circuit configuration in the case that it is achieved by hardware can be simplified. Assuming that bit data is b; protect bit data is g; the necessary final number of bits after the decimal point is eight (8) bits; and protect bits are two (2) bit, each of data in the sine function arithmetic process of FIG. 13 can be represented as follows.

Constant Qd=sb.bbbb bbbb gg

Variable Xi=b.bbbb bbbb gg

Square of variable Xi=b.bbbb bbbb gg

Constant Kd=sb.bbbb bbbb gg

In the constant table 16 of FIG. 6, when the cosine function is calculated in the range from 0 to 90 degrees, shift S2 is S2=−1. The shift S2=−1 means shifting to left by one (1) bit, and in order to ensure the same accuracy with the case of calculating from 0 to 45 degrees, the calculation must be performed with the protect bits (guard bits) which are increased one (1) bit from the case of calculating from 0 to 45 degrees. The process procedure of the sine function arithmetic process of FIG. 13 is described as follows.

Step S1: Input the address i.

Step S2: Find the variable Xi by the shift process of the address i. At this point, two (2) bits of the protect bits are added to the variable Xi.

Step S3: Square the variable Xi and round the result with half adjust.

Step S4: Set d=7 and define the known number Q(d) as the constant K(7) which is read from the constant table 16 of FIG. 6.

Step S5: Calculate d=d−2. d is varied to 5, 3, 1 and 0 by the cyclic process.

Step S6: Check whether d is not less than 1. If it is not less than 1, proceed to step S7, and if less than 1, proceed to step S8.

Step S7: Multiply the variable $Xi^2$ by the known number Q(b+2) and round the results with half adjust to obtain the intermediate value W. Perform the shift process of the intermediate value W with the shift number S(d+2). Round the value obtained by adding the constant K(d) to the intermediate value W with half adjust to obtain new known number Q(d). This calculation is repeated three (3) times for d=5, 3, 1.

Step S8: This is the case that the cyclic calculation is terminated because d becomes less than 1, and sin θ i is found by multiplying Q(1) by the variable Xi, and the value of the final number of bits is found by rounding the results with half adjust.

Step S9: Output sin θ i as the arithmetic result.

Figure 14:
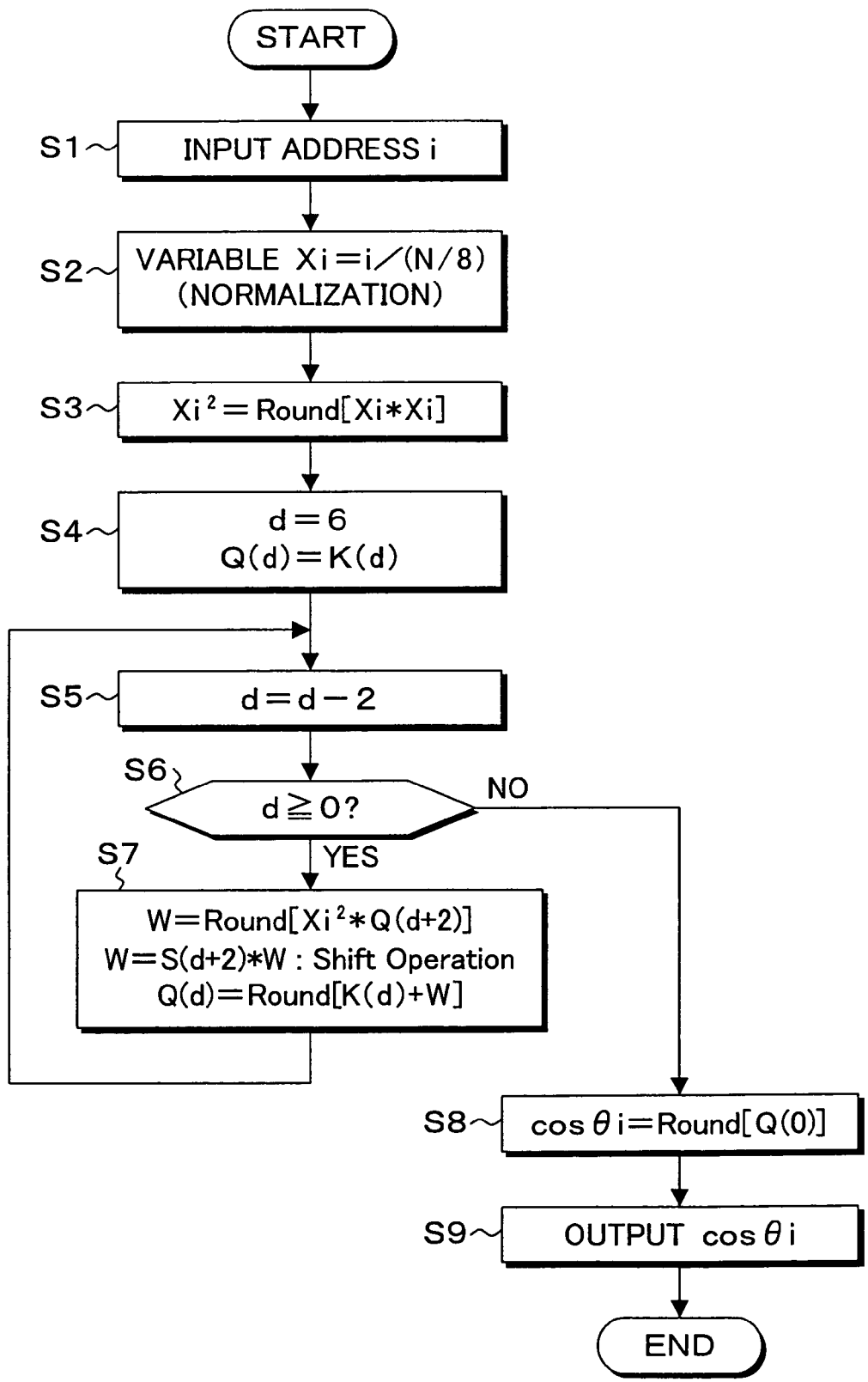
FIG. 14 is a flowchart of a cosine function arithmetic process according to the present invention which keeps accuracy by rounding arithmetic results to which protect bits are added.

FIG. 14 is a flowchart of the cosine function arithmetic process according to the present invention which keeps arithmetic accuracy by rounding arithmetic results to which protect bits are added, and the process procedure is as follows.

Step S1: Input the address i.

Step S2: Find the variable Xi by the shifting address I by (N/8). At this point, two (2) bits are added to the variable Xi as the protect bits.

Step S3: Find the square of the variable $Xi^2$ and round it with half adjust.

Step S4: Set d=6 and define the known number Q(6) as the constant K(6) which is found from the constant table 16 of FIG. 6.

Step S5: Calculate d=d−2. In this case, d is varied to d=4, 2, 0.

Step S6: Check whether d is not less than 0. If it is not less than 0, proceed to step S7, and if it is minus, proceed to step S8.

Step S7: Multiply the variable $Xi^2$ by the known number Q(b+2) and find the intermediate value W by rounding with half adjust. Then, after performing the shift process of the intermediate value W with the shift number S(d+2), add the constant K(d) and perform rounding with half adjust to find new known number Q(d). This arithmetic process is executed three (3) times for Q(4), Q(2) and Q(0) through the loop process from S5 to S7.

Step S8: This is the case that the cyclic arithmetic is terminated because d becomes minus, and cos θ i with the final number of bits is found by rounding Q(0) found in step S7 with half adjust.

Step S9: Output cos θ i as the arithmetic result.

For rounding in the processes of FIG. 13 and FIG. 14, the half adjust is taken as an example, but cutoff of lower bits may also be used. For the half adjust, by adding 1 to the position which is one (1) bit lower than the lowest bit position to be found, calculating and then performing cutoff, the half adjust can be achieved. Cutoff may be achieved by leaving the necessary number of bits after the decimal point and cutting off subsequent bits.

Figure 15:
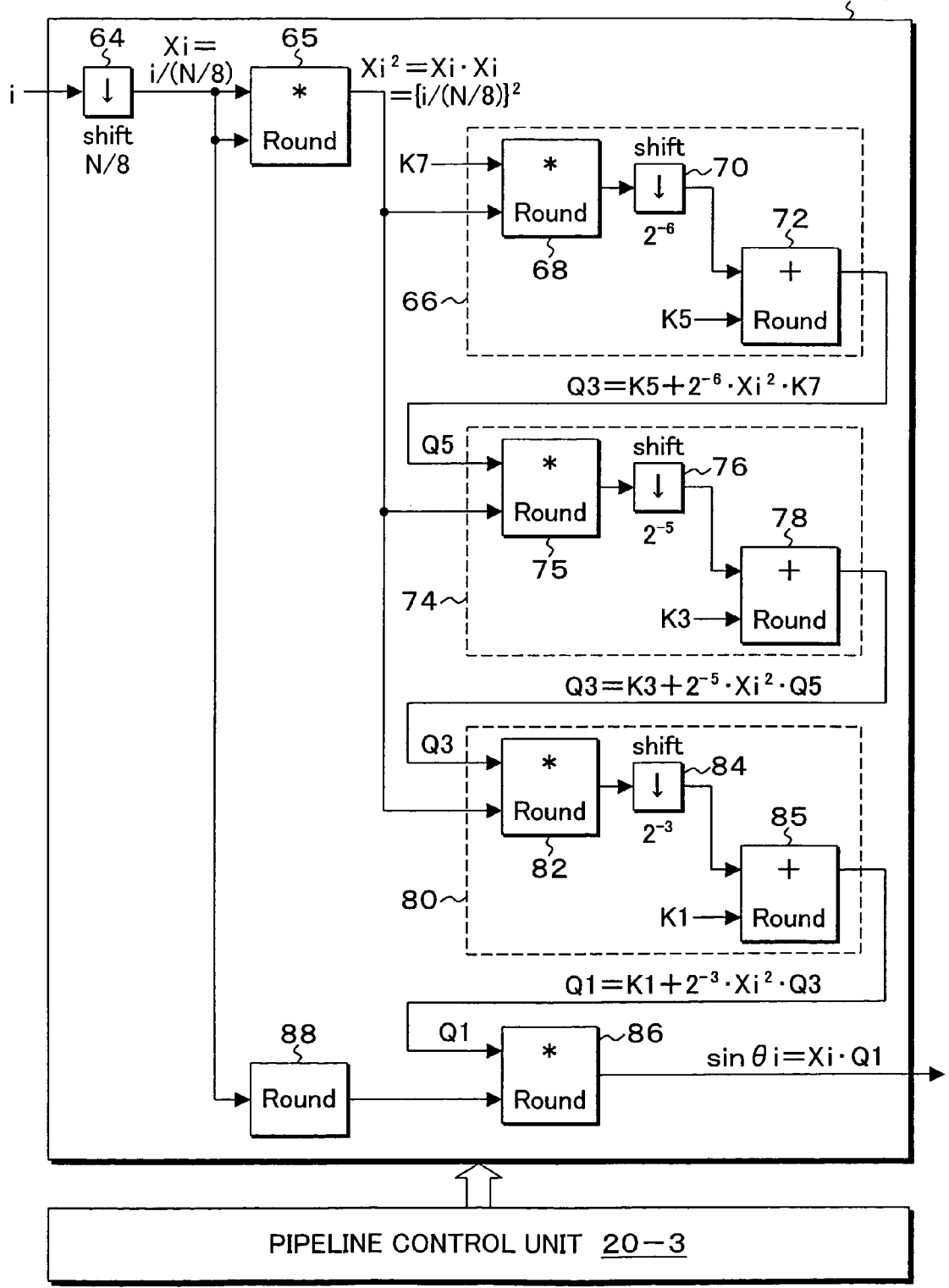
FIG. 15 is a circuit block diagram of a sine function arithmetic circuit of the present invention which performs pipeline arithmetic.

FIG. 15 is another embodiment of the function arithmetic circuit of the present invention based on the hardware configuration shown in FIG. 10 and an embodiment of a sine function arithmetic circuit which performs pipeline arithmetic. This pipeline sine function arithmetic circuit keeps arithmetic accuracy by rounding the arithmetic results to which protect bits are added, as is the case with the sine function arithmetic process of FIG. 13.

Figure 16:
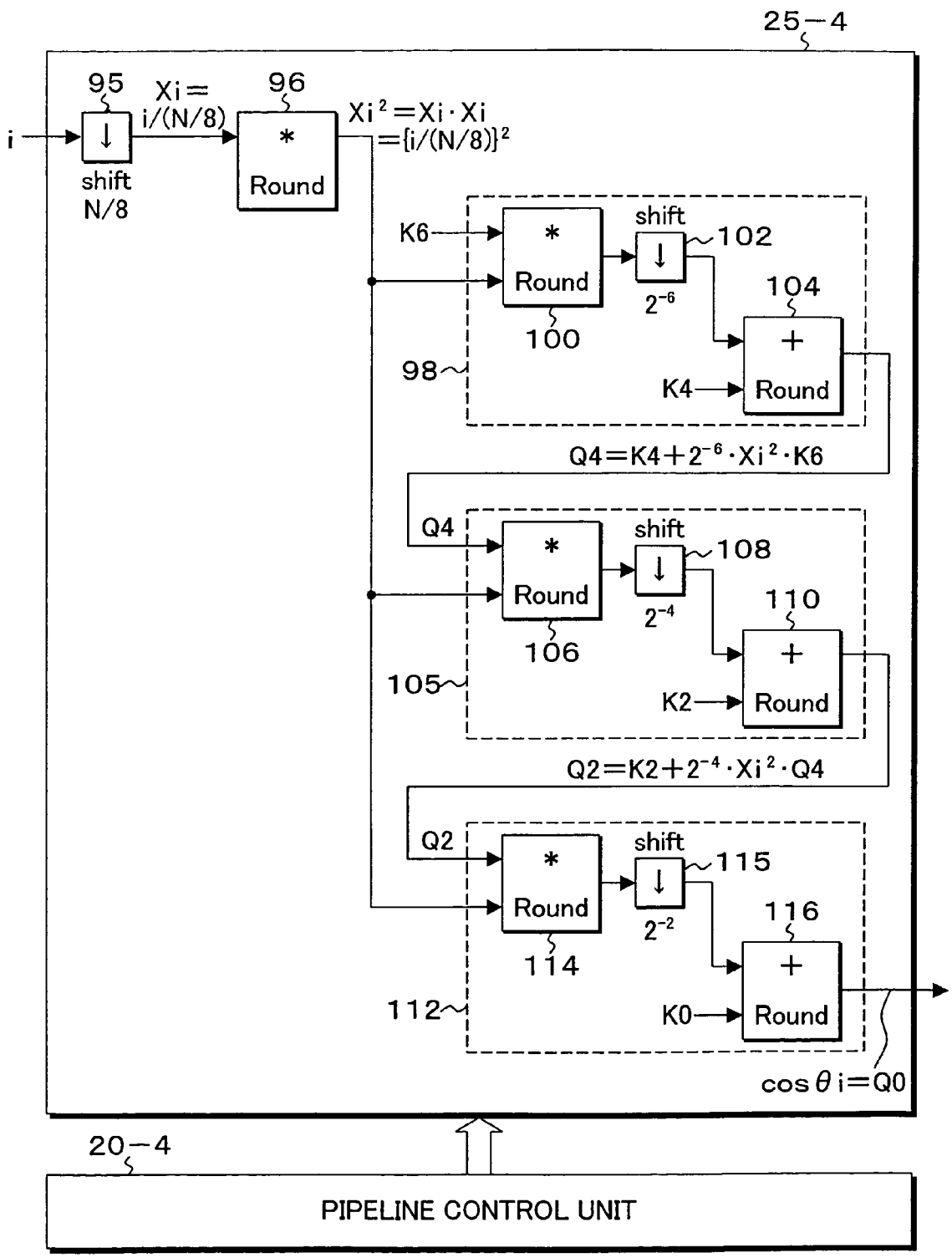
FIG. 16 is a circuit block diagram of a cosine function arithmetic circuit of the present invention which performs pipeline arithmetic.

In FIG. 16, a sine function pipeline arithmetic circuit 25-3 consists of a conversion shift circuit 64, a multiplier 65, a first arithmetic unit 66, a second arithmetic unit 74, a third arithmetic unit 80, a multiplier 86 and a rounding circuit 88. The first arithmetic unit 66, the second arithmetic unit 74 and the third arithmetic unit 80 are in the pipeline connection. The first arithmetic unit 66 is comprised of a multiplier 68, a shift circuit 70 and an adder 72; the second arithmetic unit 74 is comprised of a multiplier 75, a shift circuit 76 and an adder 78; the third arithmetic unit 80 is comprised of a multiplier 82, a shift circuit 84 and an adder 85; and each of these three (3) arithmetic units 66, 74 and 80 is provided with the same circuit configuration. The multipliers 65, 68, 75, 82 and 86 and the adders 72, 78 and 85 are provided with a rounding function (Round) and perform cutoff or half adjust for the arithmetic results. The cutoff is performed by cutting off lower bits after the valid bits. In the case of the half adjust, by adding 1 to the position which is one (1) bit lower than the lowest bit position of the valid bit, calculating and then performing cutoff, the half adjust can be achieved. In this case, for example, by adding appropriate protect bits (guard bits) to eight (8) bits after the decimal point which are valid bits and performing calculation, for example, by adding two (2) guard bits to each of the known number Qd, the variable Xi and $Xi^2$ and the constant Kd and performing calculation, the calculation can be performed with practical arithmetic accuracy even in the case that rounding is the cutoff process. As the shift circuit 70, 76 and 84, circuits do not particularly have to be provided in actual hardware, and when the output signals of the multipliers 68, 75 and 82 are supplied to each of the adder 72, 78 and 85 as the input signals, only the function for changing the bit position may be provided. In this sine function pipeline arithmetic circuit 25-3, when the address i indicating angles is sequentially input in sync with the arithmetic cycles in conformity with a pipeline control unit 20-3, pipeline arithmetic is achieved, in which, for example, the first arithmetic result of the sine function is output in the ninth cycle, and after that, the arithmetic results of the sine function are sequentially output for each cycle.

FIG. 16 shows an embodiment of a cosine function arithmetic circuit according to the present invention which performs pipeline arithmetic. This cosine function pipeline arithmetic circuit 25-4 consists of a conversion shift circuit 95, a multiplier 96, a first arithmetic unit 98, a second arithmetic unit 105 and a third arithmetic unit 112, the first arithmetic unit 98, the second arithmetic unit 105 and the third arithmetic unit 112 are in the pipeline connection. The first arithmetic unit 98 consists of a multiplier 100, a shift circuit 102 and an adder 104; the second arithmetic unit 105 consists of a multiplier 106, a shift circuit 108 and an adder 110; the third arithmetic unit 112 consists of a multiplier 114, a shift circuit 115 and an adder 116; and three (3) arithmetic units have the same circuit configuration and are in the pipeline connection. The multipliers 96, 100, 106 and 114 and the adders 104, 110 and 116 are provided with a function for performing the cutoff or the half adjust to the necessary number of the bits by rounding. In this cosine function pipeline arithmetic circuit 25-3, when the address i as angle information is sequentially input in each arithmetic cycle by pipeline arithmetic control of a pipeline control unit 20-4, the first arithmetic result of the cosine function can be output in the eighth cycle, and after that, the arithmetic results will be sequentially output for each cycle.

Figure 17A:
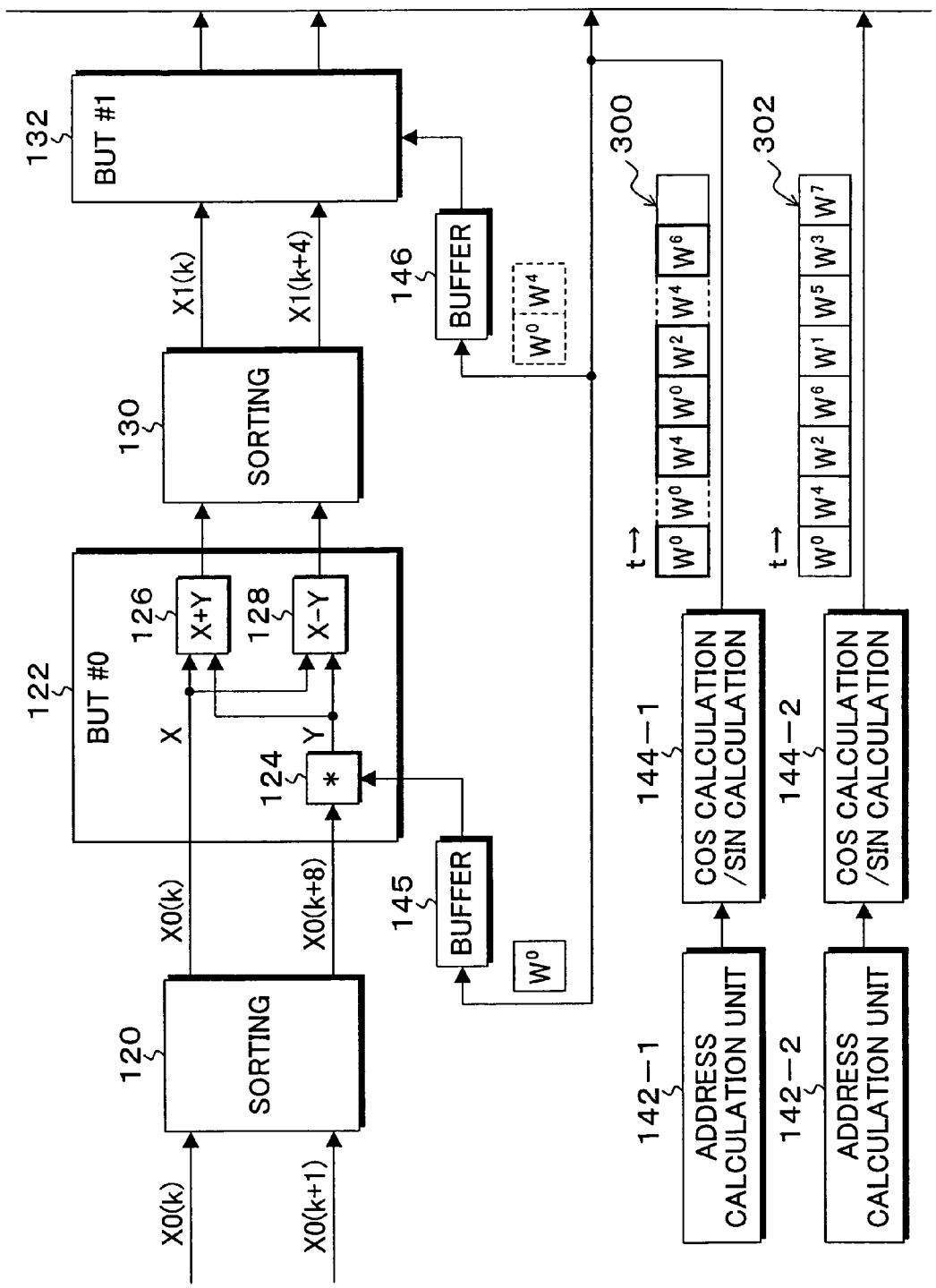
FIGS. 17A and 17B are block diagrams of a fast Fourier transform circuit whose radix is 2, to which a function arithmetic circuit of the present invention performing the pipeline arithmetic of FIG. 15 and FIG. 16 as twist coefficient arithmetic is applied.
Figure 17B:
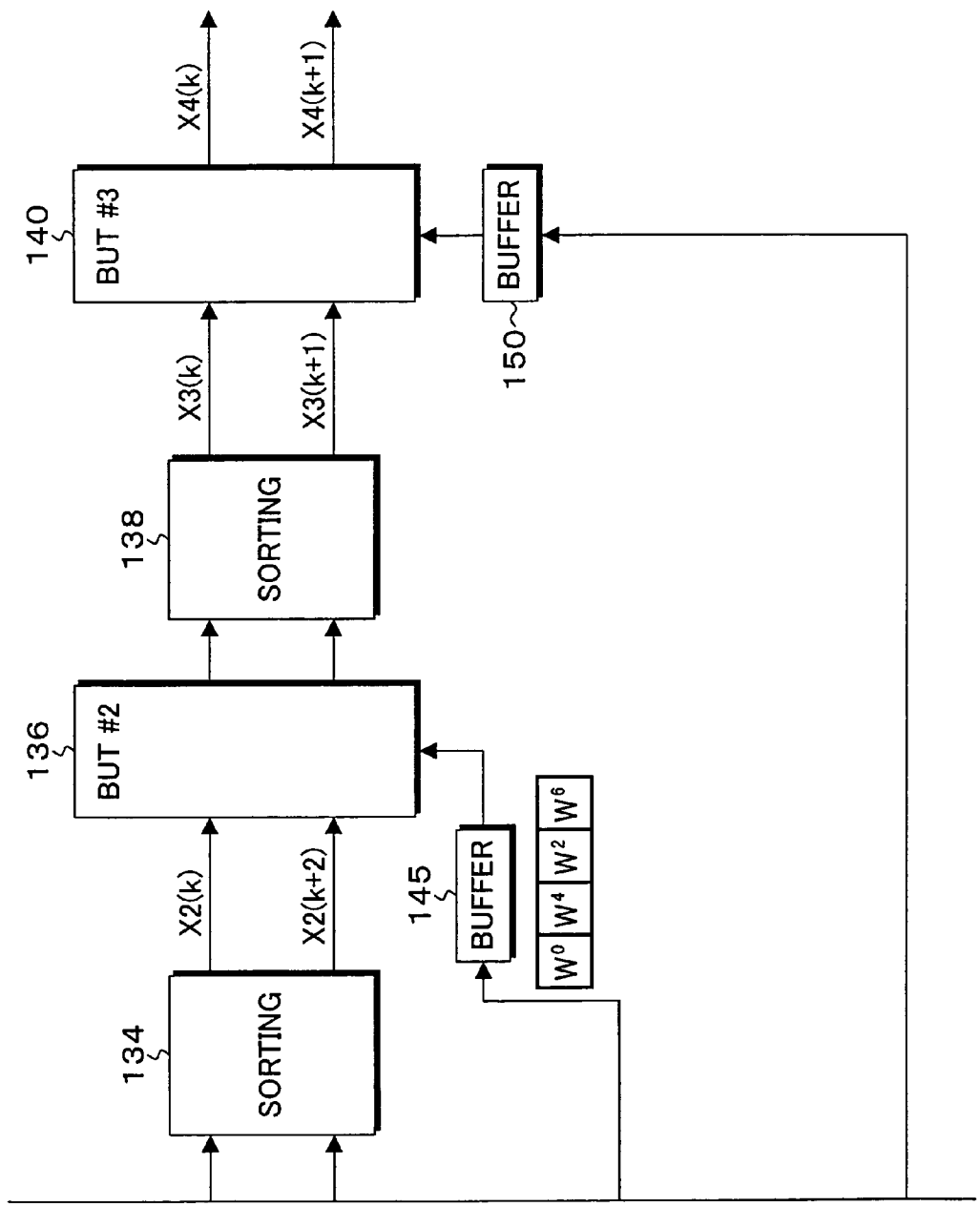

FIGS. 17A and 17B are block diagrams of the case that the pipeline sine function and cosine function arithmetic circuits shown in FIG. 15 and FIG. 16 are applied to a fast Fourier transform circuit whose radix is 2. In FIGS. 17A and 17B, the fast Fourier transform circuit with radix 2 has a four-stage structure of a sorting circuit 120, a butterfly arithmetic unit 122, a sorting circuit 130, a butterfly arithmetic unit 132, a sorting circuit 134, a butterfly arithmetic unit 136, a sorting circuit 138 and a butterfly arithmetic unit 140. In this embodiment, fast Fourier transform is performed by inputting 16 points of sampling data, for example. For the time-series input signal X0(k) to the sorting circuit 120, the butterfly arithmetic is performed among data of X0(k+8) in which the number k is separated by 8 in the butterfly arithmetic unit 122. In the next second-stage butterfly arithmetic unit 132, the butterfly arithmetic is performed among data X1(k+4) in which the number k of the input data X1(k) is separated by 4. Subsequently, in the third-stage butterfly arithmetic unit 136, the butterfly arithmetic is performed among data X2(k+2) in which the input data X2(k) is separated by 2. Finally, in the fourth-stage butterfly arithmetic unit 140, the butterfly arithmetic is performed among data X3 (k+1) in which the input data X3 (k) is separated by 1, and Fourier transform output X4 (k) and X4 (k+1) are output.

Figure 18:
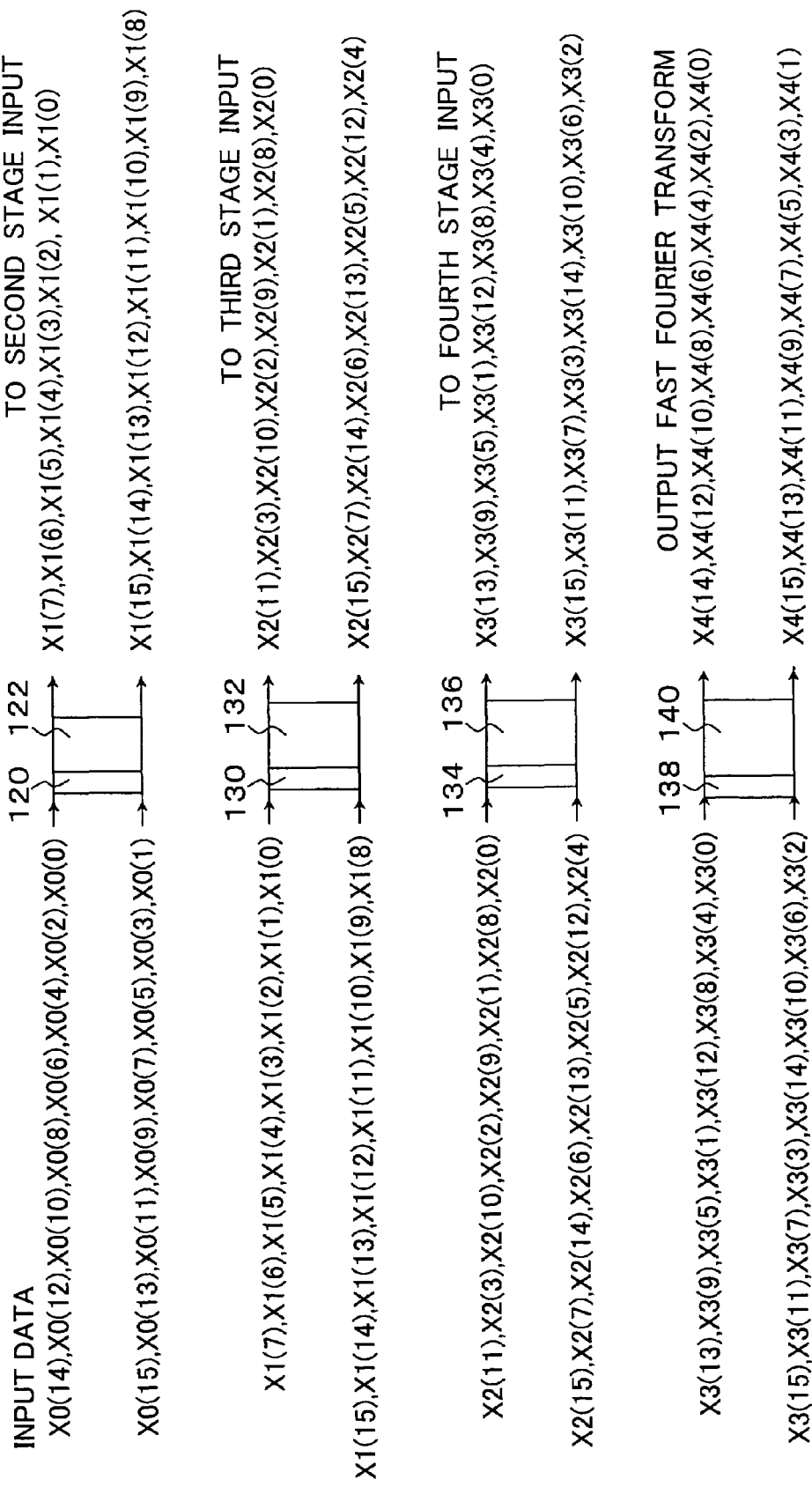
FIG. 18 is an explanatory view of sorting across four (4) stages of FIGS. 17A and 17B and I/O data of butterfly arithmetic.

FIG. 18 shows input and output data in each combined portion of the sorting circuits 120, 130, 134 and 138 and the butterfly arithmetic units 122, 132, 136 and 140 of the first stage to the fourth stage in the fast Fourier transform circuit of FIGS. 17A and 17B. In FIG. 18, out of 16 points of sampling data, X0 (0), X0 (2), ..., and X0 (14) whose numbers are even and X0 (1), X0 (3), ..., and X0(1) whose numbers are odd are respectively input to two (2) inputs, and the butterfly arithmetic is performed among data separated by K=8, and the arithmetic data shown on the right side of the butterfly arithmetic unit 122 are obtained. These data are sequentially input to the sorting circuit 130 on the second row as two (2) units of data, and with the butterfly arithmetic unit 132, the arithmetic data on the right side thereof is obtained. Subsequently, the output data on the second row are input to the third-stage sorting circuit on the third row; the arithmetic result on the right side of the butterfly arithmetic unit 136 is obtained; and after this result is input to the sorting circuit 138 as the fourth-stage input on the fourth row, the result of the fast Fourier transform output shown on the right side is obtained by arithmetic with the butterfly arithmetic unit 140.

Referring again to FIGS. 17A and 17B, as shown, for example, in the first-stage butterfly arithmetic unit 122, the multiplier 124 performs twist coefficient multiplication which multiplies the input data by a twist coefficient $W^0$ obtained via a buffer 145. For this twist coefficient increases, the number of types are increased by 2n such as 1, 2, 4 and 8 in the order from the first stage to the fourth stage. Each of the twist coefficients on each stage is used eight (8) times on the first stage, four times on the second stage, twice on the third stage and once on the fourth stage for multiplication.

Multiplication of these twist coefficients and each of data on each stage of FIG. 18 is shown as follows.

(The first stage) X0 (8)·$W^0$, X0 (9)·$W^0$, X0 (10)·$W^0$, X0 (11)·$W^0$, X0 (12)·$W^0$, X0 (13)·$W^0$, X0 (14)·$W^0$, X0 (15)·$W^0$ (The second stage) X1 (4)·$W^0$, X1 (5)·$W^0$, X1 (6)·$W^0$, X1 (7)·$W^0$,

X1 (12)·$W^4$, X1 (13)·$W^4$, X1 (14)·$W^4$, X1 (15)·$W^4$ (The third stage) X2 (2)·$W^0$, X2 (3)·$W^0$,

X2 (6)·$W^4$, X2 (7)·$W^4$,

X2 (10)·$W^2$, X2 (11)·$W^2$,

X2 (14)·$W^6$, X2(15)·$W^6$ (The fourth stage) X3 (1)·$W^0$,

X3 (3)·$W^4$,

X3 (5)·$W^2$,

X3 (7)·$W^6$,

X3 (9)·$W^1$,

X3 (11)·$W^5$,

X3 (13)·$W^3$,

X3 (15)·$W^7$

These twist coefficients used in the butterfly arithmetic units 122, 132, 136 and 140 are calculated in each of function arithmetic units 144-1 and 144-2 in real time, based on the address i given from address calculation units 142-1 and 142-2. Each of the twist coefficient arithmetic units 144-1 and 144-2 is provided with the sine function pipeline arithmetic circuit 25-3 shown in FIG. 15 and the cosine function pipeline arithmetic circuit 25-4 shown in FIG. 16, calculates the necessary twist coefficients in real time in sync with the arithmetic cycles of the butterfly arithmetic units 122, 132, 136 and 140 on four (4) stages and stores necessary types of the twist coefficients into each of the buffers 145, 146, 148 and 150, and on the fourth stage, eight (8) types of the twist coefficients $W^0$, $W^4$, ... and $W^7$ are sequentially calculated by the dedicated twist coefficient arithmetic unit 144-2. When represented using $W^p$, the twist coefficient is represented by multiplication of complex numbers as following equation.

$$W^p = e^{-j2\pi p/N} = \cos(2\pi p/N) - j \cdot \sin(2\pi p/N)$$

In this multiplication of complex numbers, the cosine function and the sine function must be calculated with an address p as an input, and this is achieved by the pipeline cosine function arithmetic circuit and sine function arithmetic circuit of the present invention. The twist coefficient arithmetic unit 144-1 calculates the necessary twist coefficients by the arithmetic timing of the butterfly arithmetic of each stage in the fast Fourier transform and stores these into the buffer 145, 146, 148 and 150. In other words, the twist coefficient arithmetic unit 144-1 calculates $W^0$, $W^0$, $W^4$, $W^0$, $W^2$, $W^4$ and $W^6$ as a twist coefficient sequence 300 as time t elapses and stores the twist coefficients indicated by black borders into the buffer registers 145, 146 and 148 such that one (1) type is stored for the first stage, two (2) types for the second stage and four (4) types for the fourth stage. The twist coefficient arithmetic unit 144-2 is provided exclusively for the fourth-stage butterfly arithmetic unit 140, sequentially calculates $W^0$, $W^4$, $W^2$, $W^6$, $W^1$, $W^5$, $W^3$ and $W^7$ as a twist coefficient sequence 302 as time t elapses and stores this into the buffer 150. Then, the butterfly multiplication will be performed, in which the underside input data of sets of two (2) input data shown on the first stage to the fourth stage of FIG. 18 are multiplied by the corresponding twist coefficients.

Figure 19A:
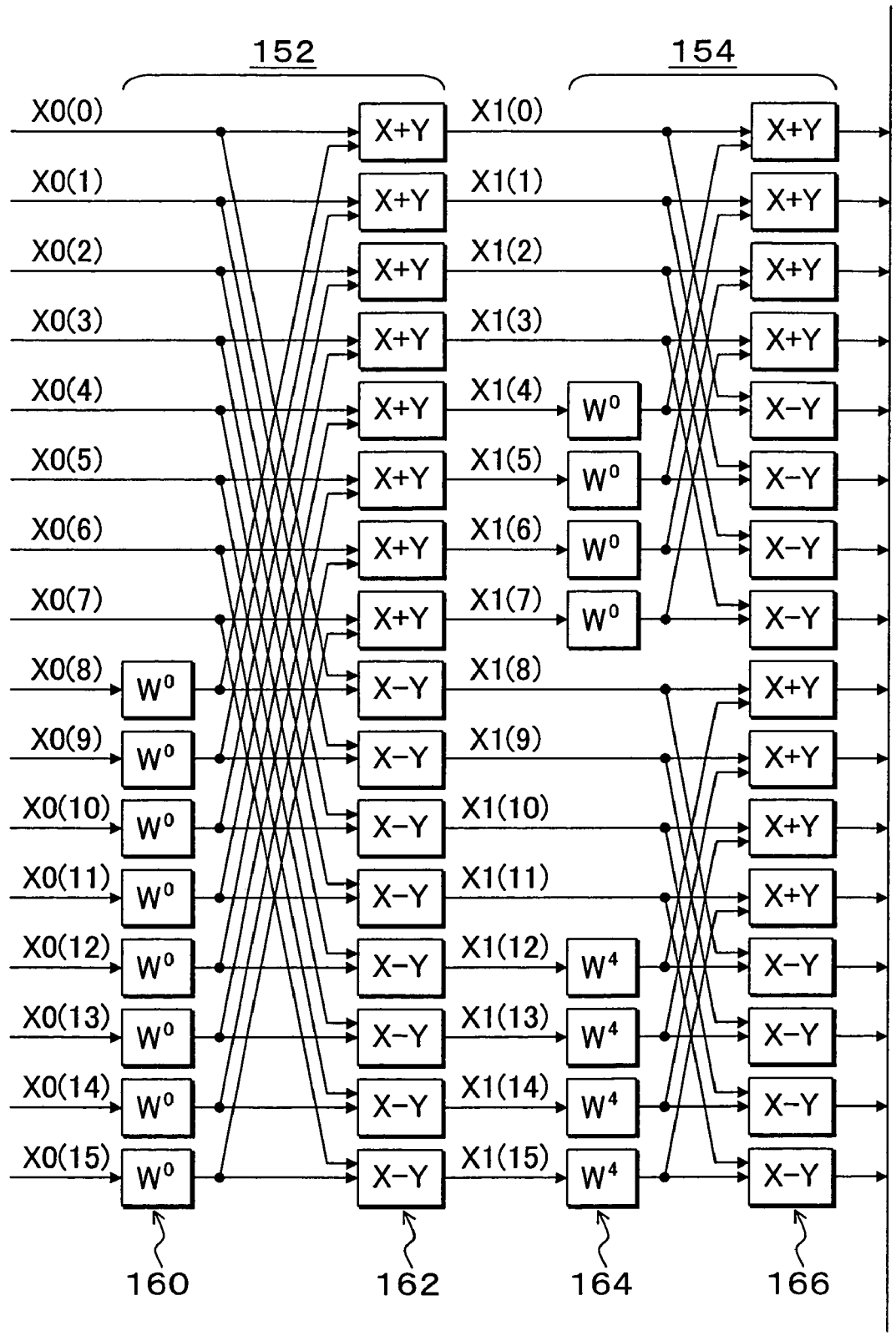
FIGS. 19A and 19B are block diagrams in which the fast Fourier transform circuit of FIGS. 17A and 17B is in a parallel configuration.
Figure 19B:
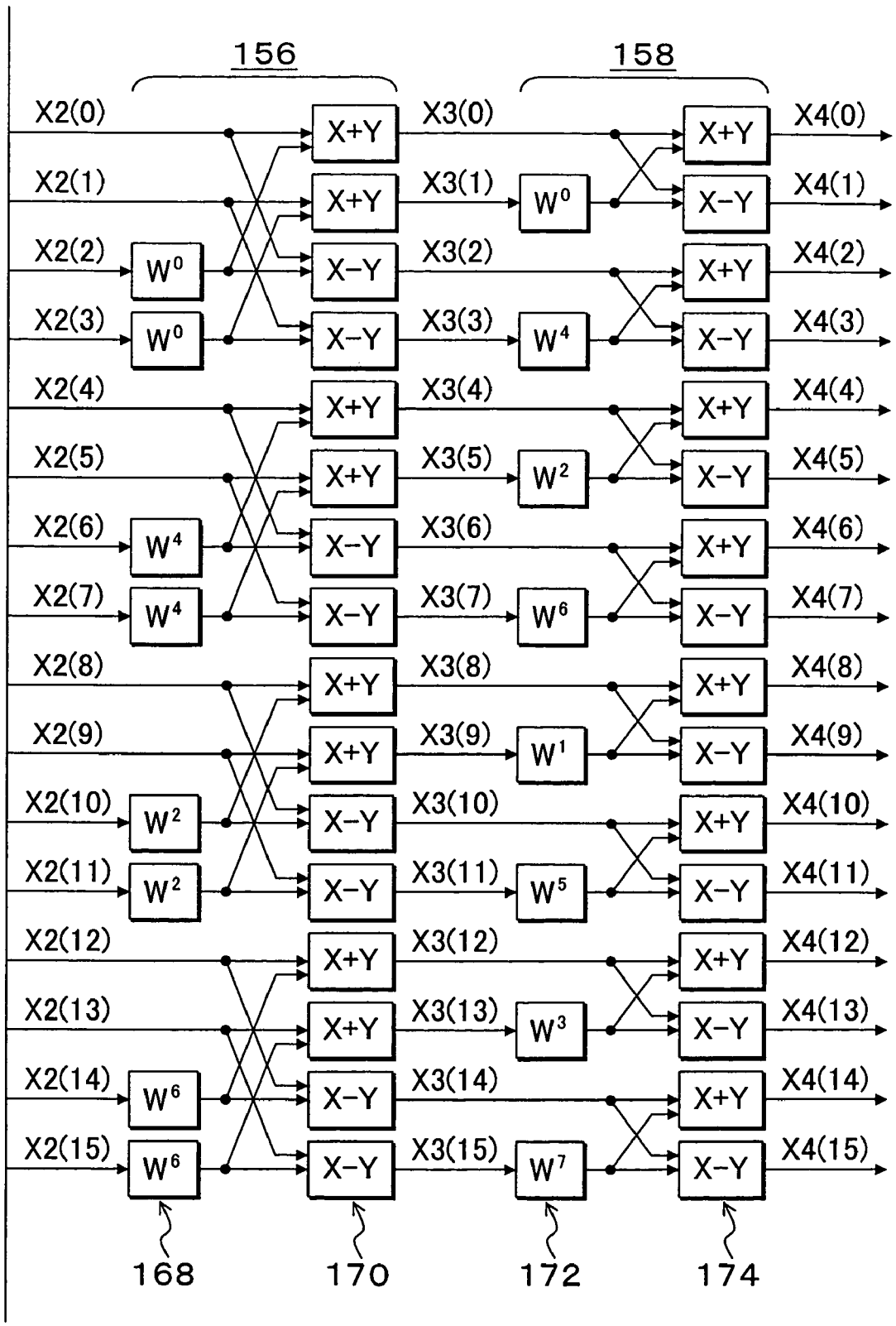

FIGS. 19A and 19B are block diagrams in which the fast Fourier transform circuit of FIGS. 17A and 17B is in a parallel configuration. In this fast Fourier transform circuit, the radix is 2 and the sampling points are 16 points, as is the case with FIGS. 17A and 17B. In FIGS. 19A and 19B, the fast Fourier transform circuit which is in a parallel configuration consists of a first-stage butterfly arithmetic unit 152, a second-stage butterfly arithmetic unit 154, a third-stage butterfly arithmetic unit 156 and a fourth-stage butterfly arithmetic unit 158. The first-stage butterfly arithmetic unit 152 consists of a twist coefficient multiplication unit 160, comprising eight (8) multipliers, and a 16-piece adder group 162. The second-stage butterfly arithmetic unit 154 consists of a twist coefficient multiplication unit 164, which uses multipliers divided into two (2) sets of four (4) pieces, and an adder group 166, comprising 16 adders. The third-stage butterfly arithmetic unit 156 consists of a twist coefficient multiplication unit 168, comprising four (4) sets of two (2) multipliers, and an adder group 170, comprising 16 adders. The fourth-stage butterfly arithmetic unit 158 consists of a twist coefficient multiplication unit 172, comprising eight (8) multipliers, and an adder group 174, comprising 16 adders. In this fast Fourier transform circuit in a parallel configuration, the number of arithmetic stages from an input stage to an output stage is eight (8) stages, and the arithmetic process can be completed in eight (8) clock cycles.

A twist coefficient arithmetic circuit of FIG. 20 is provided, corresponding to the fast Fourier transform circuit in a parallel configuration of FIGS. 19A and 19B, in order to supply the necessary twist coefficients in real time to each of the twist coefficient multiplication units 160, 164, 168 and 172 on each stage. The twist coefficient arithmetic circuit of FIG. 20 is basically the same as the fast Fourier transform circuit of FIGS. 17A and 17B. Corresponding to the first-stage butterfly arithmetic unit 152, the second-stage butterfly arithmetic unit 154 and the third-stage butterfly arithmetic unit 156, an address calculation unit 142-1 and a twist coefficient arithmetic unit 144-1 are provided. Corresponding to the first-stage butterfly arithmetic unit 152, the second-stage butterfly arithmetic unit 154 and the third-stage arithmetic unit 156, buffer registers 176, 178 and 180 are also provided, respectively. For the fourth-stage butterfly arithmetic unit 158, an independent address calculation unit 142-2 and a twist coefficient arithmetic unit 144-2 are provided, and a buffer 182 is also provided. The twist coefficient arithmetic unit 144-1 outputs the twist coefficients $W^0$, $W^4$, $W^2$ and $W^6$ at the timings of times t0, t1, t2 and t3 indicated in an output series 184 based on t=0, 4, 2, 6 from the address calculation unit 142-1, stores $W^0$ into the buffer 176, stores $W^0$ and $W^4$ into the buffer 178 and stores the twist coefficients $W^0$, $W^4$, $W^2$ and $W^6$ into the buffer 180. On the other hand, the twist coefficient arithmetic unit 144-2 sequentially calculates the twist coefficients $W^0$, $W^4$, $W^2$, $W^6$, $W^1$, $W^5$, $W^3$ and $W^7$ at the timings of times t0 to t7 as shown in an output series 186 based on addresses t=0, 4, 2, 6, 1, 5, 3, 7 from the address calculation unit 142-2 and stores these into the buffer 182. In the fast Fourier transform circuit in a parallel configuration of FIGS. 19A and 19B, eight multipliers provided in the twist coefficient multiplication unit 160 of the first-stage butterfly arithmetic unit 152 performs the twist coefficient multiplication using the twist coefficient W0 in the buffer register 176 at the timing of the time t1. The twist coefficient multiplication unit 164 of the second-stage butterfly arithmetic unit 154 performs the twist coefficient multiplication using the twist coefficients W0 and W4 stored in the buffer register 178 at the timing of the time t3. The twist coefficient multiplication unit 168 of the third-stage butterfly arithmetic unit 156 performs the twist coefficient multiplication using the twist coefficients W0, W4, W2 and W6 already stored in the buffer register 180 at the timing of the time t5. The fourth-stage butterfly arithmetic unit 158 performs the twist coefficient multiplication using eight (8) types of the twist coefficients which are the twist coefficients $W^0$, $W^4$, ... and $W^7$ stored in the buffer register 182 at the timing of the time t7. In this way, by combining the fast Fourier transform circuit in a parallel configuration of FIGS. 19A and 19B with the twist coefficient arithmetic circuit of FIG. 20, the fast Fourier transform output can be obtained by performing the butterfly arithmetic across four (4) stages in parallel in eight (8) arithmetic cycles from the input for 16 points of sampling data of variables X0 (0) to X0(15). In the arithmetic circuits of the sine function and the cosine function of FIG. 11 and FIG. 12, one (1) cyclic processing unit is provided and used repeatedly to the perform function arithmetic, but it is possible to convert this into the pipeline type as shown in FIG. 15 and FIG. 16. It is also possible to convert the pipeline sine and cosine arithmetic circuits shown in FIG. 15 and FIG. 16 into the function arithmetic circuits as shown in FIG. 11 and FIG. 12, in which one (1) cyclic processing unit is provided and used repeatedly.

In above embodiments, the sine function and the cosine function are taken as an example of the arithmetic process which is processed by transforming the Taylor series equation into the cyclic equation, but it is possible to apply to other trigonometric functions, such as a tangent function, a cosecant function, a secant function and cotangent function, and a logarithmic function and an exponential function included in general transcendental functions other than trigonometric functions to which the Taylor series equation is applied. When the Taylor series equation for the general transcendental functions other than trigonometric functions are transformed into the cyclic type of the present invention, the variable may be simply defined as X, rather than $X^2$, and the Taylor series equation may be transformed into the cyclic equation which multiplies the known number Q and the variable X, shifts the result by the shift number S and then adds variable K to obtain new known number Q.

The present invention has been described such that the hardware circuit can be easily achieved by defining the variable Xi such that its maximum value becomes 1 and the constant Kd to be not greater then 1, but considering the configuration of the arithmetic processing circuit or movement of the decimal point position, it is not limited to this value. In the case of hardware using the floating-point arithmetic circuit or the case of the software process by CPU or DSP which can use the floating-point arithmetic, by only transforming the Taylor series equation into the cyclic equation, it is possible to cut down the number of times of arithmetic, to reduce the processing load and to achieve the high-speed processing.

Although in the above embodiments the case has been taken as an example where the arithmetic results of the sine function and the cosine function are applied to the fast Fourier transform, the present invention is not limited thereto but is directly applicable to any suitable apparatuses which utilize the arithmetic results of the sine function and the cosine function.

What is claimed is:

1. A function arithmetic method comprising:
a cyclic equation setting step performed by an arithmetic unit of a circuit for transforming and setting a Taylor series equation for calculating a sine function into a single cyclic equation common to terms of the Taylor series equation, the single cyclic equation having a new known number Q that is defined by multiplying a known number Q and the square of a variable X, shifting the result by a shift number S and then adding a constant K thereto;
an adjustment step performed by an adjustment unit of said circuit for adjusting and preparing the shift number S such that within a variation range of the variable X the variable X has a maximum value 1 with the constant K being not greater than 1;
a cyclic equation executing step preformed by the adjustment unit of said circuit for inputting and converting angle information i to the variable X, and executing the cyclic equation in sequence from higher order term to lower order term for the number of terms of the Taylor series equation to derive a sine function of the angle information i; and an output step outputting the sine function for a fast Fourier transform.

2. The function arithmetic method according to claim 1, wherein the cyclic equation executing step performed by the adjustment unit of said circuit includes executing the arithmetic process of the known number Q, the variable X, an intermediate value after the shifting and the constant K of the cyclic equation with the number of bits that is obtained by adding the number of protect bits to the final number of the bits.

3. A function arithmetic method comprising:

a cyclic equation setting step performed by an arithmetic unit of a circuit for transforming and setting a Taylor series equation for calculating a cosine function into a single cyclic equation common to terms of the Taylor series equation, the single cyclic equation having a new known number Q that is defined by multiplying a known number Q and the square of a variable X, shifting the result by a shift number S and then adding a constant K thereto;

an adjustment step performed by an adjustment unit of said circuit for adjusting and preparing the shift number S such that within a variation range of the variable X the variable X has a maximum value 1 with the constant K being not greater than 1;

a cyclic equation executing step performed by the adjustment unit of said circuit for inputting and converting angle information i to the variable X, and executing the cyclic equation in sequence from higher order term to lower order term for the number of terms of the Taylor series equation to derive a cosine function of the angle information i; and an output step outputting the cosine function for a fast Fourier transform.

4. The function arithmetic method according to claim 3, wherein the cyclic equation executing step performed by the adjustment unit of said circuit includes executing the arithmetic process of the known number Q, the variable X, an intermediate value after the shifting and the constant K of the cyclic equation with the number of bits that is obtained by adding the number of protect bits to the final number of the bits.

5. A computer including a function arithmetic circuit comprising:

a cyclic equation arithmetic unit calculating a cyclic equation that is obtained by transforming a Taylor series equation for calculating a sine function, the cyclic equation having a new known number Q that is defined by multiplying a known number Q and the square of a variable X, shifting the result by a shift number S and then adding a constant K thereto;

a conversion adjustment unit converting input angle information i into the variable X, as well as adjusting and outputting the shift number S such that the variable X has a maximum value 1 within a variation range of the variable X;

a constant table finding in advance and holding constants K corresponding to terms of a Taylor series equation for calculating a sine function and the shift numbers adjusted such that the constants K becomes not greater than 1;

an arithmetic control unit causing the cyclic equation arithmetic unit to perform a cyclic arithmetic in sequence, based on the selection of the constant K and the shift number S of the constant table, from higher order term to lower order term for the number of terms of the Taylor series equation defined in advance when the variable X is output from the conversion adjustment unit, to thereby derive a sine function of the angle information i; and an output unit outputting the sine function for a fast Fourier transform.

6. The function arithmetic circuit according to claim 5, wherein the cyclic equation arithmetic unit executes the arithmetic process of the known number Q, the variable X, an intermediate value after the shifting and the constant K of the cyclic equation with the number of bits that is obtained by adding the number of protect bits to the final number of the bits.

7. A computer including a function arithmetic circuit comprising:

a cyclic equation arithmetic unit calculating a cyclic equation that is obtained by transforming a Taylor series equation for calculating a cosine function, the cyclic equation having a new known number Q that is defined by multiplying a known number Q and the square of a variable X, shifting the result by a shift number S and then adding a constant K thereto;

a conversion adjustment unit converting input angle information i into the variable X, as well as adjusting and outputting the shift number S such that the variable X has a maximum value 1 within a variation range of the variable X;

a constant table finding in advance and holding constants K corresponding to terms of the Taylor series equation for calculating a cosine function and the shift numbers adjusted such that the constants K become not greater than 1;

an arithmetic control unit causing the cyclic equation arithmetic unit to perform a cyclic arithmetic in sequence, based on the selection of the constant K and the shift number S of the constant table, from higher order term to lower order term for the number of terms of the Taylor series equation defined in advance when the variable X is output from the conversion adjustment unit, to thereby derive a cosine function of the angle information i; and an output unit outputting the cosine function for a fast Fourier transform.

8. The function arithmetic circuit according to claim 7, wherein the cyclic equation arithmetic unit executes the arithmetic process of the known number Q, the variable X, an intermediate value after the shifting and the constant K of the cyclic equation with the number of bits that is obtained by adding the number of protect bits to the final number of the bits.

9. A computer including a function arithmetic circuit comprising:

a pipeline arithmetic unit forming a pipeline connection which includes cyclic equation arithmetic units each provided for each term and calculating a cyclic equation obtained by transforming a Taylor series equation for calculating a sine function, the cyclic equation having a new known number Q that is defined by multiplying a known number Q and the square of a variable X, shifting the result by a shift number S and then adding a constant K thereto;

a conversion adjustment unit converting input angle information i into the variable X and adjusting the shift number S such that the variable X has a maximum value 1 within a variation range of the variable X for the output to the pipeline arithmetic unit;

a constant table finding in advance and holding the constants K corresponding to terms of the Taylor series equation for calculating a sine function and the shift numbers adjusted such that the constants K become not greater than 1;

a pipeline control unit causing the cyclic equation arithmetic units of the pipeline arithmetic unit to select the constant K and the shift number S of the corresponding term of the Taylor series equation from the constant table, to calculate in parallel and to derive a sine function of the angle information i based on the output of the cyclic equation arithmetic unit at the final stage, each time the variable X is output from the conversion adjustment unit; and an output unit outputting the sine function for a fast Fourier transform.

10. The function arithmetic circuit according to claim 9, wherein the cyclic equation arithmetic units of the pipeline arithmetic unit execute the arithmetic process of the known number Q, the variable X, an intermediate value after the shifting and the constant K of the cyclic equation with the number of bits that is obtained by adding the number of protect bits to the final number of the bits.

11. A computer including a function arithmetic circuit comprising:

a pipeline arithmetic unit forming a pipeline connection which includes cyclic equation arithmetic units each provided for each term and calculating a cyclic equation obtained by transforming a Taylor series equation for calculating a cosine function, the cyclic equation having a new known number Q that is defined by multiplying a known number Q and the square of a variable X, shifting the result by a shift number S and then adding a constant K thereto;

a conversion adjustment unit converting input angle information i into the variable X and adjusting the shift number S such that the variable X has a maximum value 1 within a variation range of the variable X for the output to the pipeline arithmetic unit;

a constant table finding in advance and holding the constants K corresponding to terms of the Taylor series equation for calculating a cosine function and the shift numbers adjusted such that the constants K become not greater than 1;

a pipeline control unit causing the cyclic equation arithmetic units of the pipeline arithmetic unit to select the constant K and the shift number S of the corresponding term of the Taylor series equation from the constant table, to calculate in parallel and to derive a cosine function of the angle information i based on the output of the cyclic equation arithmetic unit at the final stage, each time the variable X is output from the conversion adjustment unit; and an output unit outputting the cosine function for a fast Fourier transform.

12. The function arithmetic circuit according to claim 11, wherein the cyclic equation arithmetic units of the pipeline arithmetic unit execute the arithmetic process of the known number Q, the variable X, an intermediate value after the shifting and the constant K of the cyclic equation with the number of bits that is obtained by adding the number of protect bits to the final number of the bits.

13. A computer including a function arithmetic circuit comprising a sine function arithmetic circuit and a cosine function arithmetic circuit, the sine function arithmetic circuit including:

a pipeline arithmetic unit forming a pipeline connection which includes cyclic equation arithmetic units each provided for each term and calculating a cyclic equation obtained by transforming a Taylor series equation for calculating a sine function, the cyclic equation having a new known number Q that is defined by multiplying a known number Q and the square of a variable X, shifting the result by a shift number S and then adding a constant K thereto;

a conversion adjustment unit converting input angle information i into the variable X and adjusting the shift number S such that the variable X has a maximum value 1 within a variation range of the variable X for the output to the pipeline arithmetic unit;

a constant table finding in advance and holding the constants K corresponding to terms of the Taylor series equation for calculating a sine function and the shift numbers adjusted such that the constants K become not greater than 1;

a pipeline control unit causing the cyclic equation arithmetic units of the pipeline arithmetic unit to select the constant K and the shift number S of the corresponding term of the Taylor series equation from the constant table, to calculate in parallel and to derive a sine function of the angle information i based on the output of the cyclic equation arithmetic unit at the final stage, each time the variable X is output from the conversion adjustment unit; and a sine function outputting unit outputting the sine function, and wherein the cosine function arithmetic circuit including:

a pipeline arithmetic unit forming a pipeline connection which includes cyclic equation arithmetic units each provided for each term and calculating a cyclic equation obtained by transforming a Taylor series equation for calculating a cosine function, the cyclic equation having a new known number Q that is defined by multiplying a known number Q and the square of a variable X, shifting the result by a shift number S and then adding a constant K thereto;

a conversion adjustment unit converting input angle information i into the variable X and adjusting the shift number S such that the variable X has a maximum value 1 within a variation range of the variable X for the output to the pipeline arithmetic unit;

a constant table finding in advance and holding the constants K corresponding to terms of the Taylor series equation for calculating a cosine function and the shift numbers adjusted such that the constants K become not greater than 1;

a pipeline control unit causing the cyclic equation arithmetic units of the pipeline arithmetic unit to select the constant K and the shift number S of the corresponding term of the Taylor series equation from the constant table, to calculate in parallel and to derive a cosine function of the angle information i based on the output of the cyclic equation arithmetic unit at the final stage, each time the variable X is output from the conversion adjustment unit; and a cosine function outputting unit outputting the cosine function for a fast Fourier transform.

14. The function arithmetic circuit according to claim 13, wherein the cyclic equation arithmetic units of the pipeline arithmetic unit execute the arithmetic process of the known number Q, the variable X, an intermediate value after the shifting and the constant K of the cyclic equation with the number of bits that is obtained by adding the number of protect bits to the final number of the bits.

15. The function arithmetic circuit according to claim 13, wherein twist coefficient values of a plurality of butterfly stages provided in a pipeline fast Fourier transform apparatus whose radix is 2 are calculated based on the sine function and cosine function of the input information i.

16. A function arithmetic method comprising:
a cyclic equation setting step performed by an arithmetic unit of a circuit for transforming and setting a Taylor series equation for calculating a transcendental function into a single cyclic equation common to terms of the Taylor series equation, the cyclic equation having a new known number Q that is defined by multiplying a known number Q and a variable X, shifting the result by a shift number S and then adding a constant K thereto;
an adjustment step performed by an adjustment unit of said circuit for adjusting and preparing the shift number S such that within a variation range of the variable X the variable X has a maximum value 1 with the constant K being not greater than 1;
a cyclic equation executing step performed by the adjustment unit of said circuit for converting input information to the variable X and executing the cyclic equation in sequence from higher order term to lower order term for the number of terms of the Taylor series equation to thereby derive a transcendental function of the input information; and
an outputting step outputting the transcendental function for a fast Fourier transform.

* * * * *